(12) United States Patent
Howett

(10) Patent No.: US 8,687,947 B2
(45) Date of Patent: Apr. 1, 2014

(54) SYSTEMS AND METHODS FOR VARIABLE VIDEO PRODUCTION, DISTRIBUTION AND PRESENTATION

(75) Inventor: Paul Howett, Walnut Creek, CA (US)

(73) Assignee: RR Donnelley & Sons Company, Chicago, IL (US)

(*) Notice: Subject to any disclaimer, the term of this patent is extended or adjusted under 35 U.S.C. 154(b) by 0 days.

(21) Appl. No.: 13/400,497

(22) Filed: Feb. 20, 2012

(65) Prior Publication Data

US 2013/0216200 A1 Aug. 22, 2013

(51) Int. Cl.
*H04N 5/761* (2006.01)

(52) U.S. Cl.
USPC .......................................... 386/278; 386/282

(58) Field of Classification Search
None
See application file for complete search history.

(56) References Cited

U.S. PATENT DOCUMENTS

| | | |
|---|---|---|
| 4,694,490 A | 9/1987 | Harvey et al. |
| 5,153,580 A | 10/1992 | Pollack |
| 5,251,332 A | 10/1993 | Hansen |
| 5,260,778 A | 11/1993 | Kauffman et al. |
| 5,319,707 A | 6/1994 | Wasilewski et al. |
| 5,345,594 A | 9/1994 | Tsuda |
| 5,400,077 A | 3/1995 | Cookson et al. |
| 5,410,344 A | 4/1995 | Graves et al. |
| 5,412,416 A | 5/1995 | Nemirofsky |
| 5,434,678 A | 7/1995 | Abecassis |
| 5,440,632 A | 8/1995 | Bacon et al. |
| 5,446,919 A | 8/1995 | Wilkins |
| 5,497,206 A | 3/1996 | Ji |
| 5,559,548 A | 9/1996 | Davis et al. |
| 5,563,648 A | 10/1996 | Menand et al. |

(Continued)

FOREIGN PATENT DOCUMENTS

| | | |
|---|---|---|
| WO | 97/12486 | 4/1997 |
| WO | 97/17774 | 5/1997 |
| WO | 97/41673 | 11/1997 |
| WO | 99/04561 | 1/1999 |

OTHER PUBLICATIONS

"5 Great Video Personalization Advertising Campaigns (YouHave Never Heard Of)," Stupeflix Blog, http://blog.stupeflix.com/great-video-personalization-advertising-campaigns, Sep. 24, 2010, retrievied from the Internet on Jun. 1, 2011, 4 pages.

(Continued)

*Primary Examiner* — Huy T Nguyen
*Assistant Examiner* — Eileen Adams
(74) *Attorney, Agent, or Firm* — Hanley, Flight & Zimmerman, LLC

(57) ABSTRACT

An example composer to author a variable video includes a builder to create scenes, a content retriever to assign content to the scenes, a library interface to point to the content for the scenes, a labeler to tag the scenes with at least one vector based on the content, a receiver to obtain first relevance data from first intended viewer of a first version of the variable video and to obtain second relevance data from a second intended viewer of a second version of the variable video, a mapper to chart a first sequence of two or more scenes based on a vector and the first relevance data and to chart a second sequence of two or more scenes based on a vector and the second relevance data, and a publisher to publish the variable video as a single file based on the first sequence and the second sequence.

32 Claims, 16 Drawing Sheets

(56) References Cited

U.S. PATENT DOCUMENTS

| | | | |
|---|---|---|---|
| 5,583,562 A | 12/1996 | Birch et al. |
| 5,583,563 A | 12/1996 | Wanderscheid et al. |
| 5,589,892 A | 12/1996 | Knee et al. |
| 5,603,077 A | 2/1997 | Muckle et al. |
| 5,619,250 A | 4/1997 | McClellan et al. |
| 5,625,693 A | 4/1997 | Rohatgi et al. |
| 5,625,864 A | 4/1997 | Budow et al. |
| 5,627,549 A | 5/1997 | Park |
| 5,631,903 A | 5/1997 | Dianda et al. |
| 5,635,978 A | 6/1997 | Alten et al. |
| 5,636,357 A | 6/1997 | Weiner |
| 5,666,293 A | 9/1997 | Metz et al. |
| 5,671,411 A | 9/1997 | Watts et al. |
| 5,686,954 A | 11/1997 | Yoshinobu et al. |
| 5,724,521 A | 3/1998 | Dedrick |
| 5,734,589 A | 3/1998 | Kostreski et al. |
| 5,740,549 A | 4/1998 | Reilly et al. |
| 5,742,680 A | 4/1998 | Wilson |
| 5,760,820 A | 6/1998 | Eda et al. |
| 5,767,913 A | 6/1998 | Kassatly |
| 5,768,539 A | 6/1998 | Metz et al. |
| 5,774,170 A | 6/1998 | Hite et al. |
| 5,798,785 A | 8/1998 | Hendricks et al. |
| 5,838,314 A | 11/1998 | Neel et al. |
| 5,848,397 A | 12/1998 | Marsh et al. |
| 5,864,747 A | 1/1999 | Clark et al. |
| 5,886,995 A | 3/1999 | Arsenault et al. |
| 5,892,508 A | 4/1999 | Howe et al. |
| 5,892,536 A | 4/1999 | Logan et al. |
| 5,892,683 A | 4/1999 | Sung |
| 5,894,320 A | 4/1999 | Vancelette |
| 5,909,437 A | 6/1999 | Rhodes et al. |
| 5,913,013 A | 6/1999 | Abecassis |
| 5,923,362 A | 7/1999 | Klosterman |
| 5,940,737 A | 8/1999 | Eastman |
| 5,951,639 A | 9/1999 | MacInnis |
| 5,978,037 A | 11/1999 | Hilpert et al. |
| 5,978,855 A | 11/1999 | Metz et al. |
| 5,983,242 A | 11/1999 | Brown et al. |
| 6,005,597 A | 12/1999 | Barrett et al. |
| 6,009,116 A | 12/1999 | Bednarek et al. |
| 6,009,307 A | 12/1999 | Granata et al. |
| 6,011,597 A | 1/2000 | Kubo |
| 6,023,727 A | 2/2000 | Barrett et al. |
| 6,029,045 A | 2/2000 | Picco et al. |
| 6,047,317 A | 4/2000 | Bisdikian et al. |
| 6,052,554 A | 4/2000 | Hendricks et al. |
| 6,064,376 A | 5/2000 | Berezowski et al. |
| 6,067,107 A | 5/2000 | Travaille et al. |
| 6,067,440 A | 5/2000 | Diefes |
| 6,084,628 A | 7/2000 | Sawyer |
| 6,101,171 A | 8/2000 | Yoshida et al. |
| 6,133,909 A | 10/2000 | Schein et al. |
| 6,157,411 A | 12/2000 | Williams et al. |
| 6,160,546 A | 12/2000 | Thompson et al. |
| 6,160,988 A | 12/2000 | Shroyer |
| 6,166,728 A | 12/2000 | Haman et al. |
| 6,169,877 B1 | 1/2001 | Gulla' |
| 6,172,674 B1 | 1/2001 | Etheredge |
| 6,172,972 B1 | 1/2001 | Birdwell et al. |
| 6,177,931 B1 | 1/2001 | Alexander et al. |
| 6,208,636 B1 | 3/2001 | Tawil et al. |
| 6,209,129 B1 | 3/2001 | Carr et al. |
| 6,212,686 B1 | 4/2001 | Krause et al. |
| 6,216,265 B1 | 4/2001 | Roop et al. |
| 6,240,555 B1 | 5/2001 | Shoff et al. |
| 6,263,506 B1 | 7/2001 | Ezaki et al. |
| 6,282,713 B1 | 8/2001 | Kitsukawa et al. |
| 6,310,661 B1 | 10/2001 | Arsenault |
| 6,331,876 B1 | 12/2001 | Koster et al. |
| 6,331,979 B1 | 12/2001 | Dillon et al. |
| 6,348,932 B1 | 2/2002 | Nishikawa et al. |
| 6,363,525 B1 | 3/2002 | Dougherty et al. |
| 6,408,437 B1 | 6/2002 | Hendricks et al. |
| 6,426,779 B1 | 7/2002 | Noguchi et al. |
| 6,430,165 B1 | 8/2002 | Arsenault |
| 6,460,181 B1 | 10/2002 | Donnelly |
| 6,462,784 B1 | 10/2002 | Kphno et al. |
| 6,463,468 B1 | 10/2002 | Buch et al. |
| 6,469,753 B1 | 10/2002 | Klosterman et al. |
| 6,481,010 B2 | 11/2002 | Nishikawa et al. |
| 6,588,013 B1 | 7/2003 | Lumley et al. |
| 6,675,384 B1 | 1/2004 | Block et al. |
| 6,706,290 B1 | 3/2004 | Kajander et al. |
| 6,738,978 B1 | 5/2004 | Hendricks et al. |
| 6,876,974 B1 | 4/2005 | Marsh et al. |
| 7,430,360 B2 | 9/2008 | Abecassis |
| 7,493,640 B1 | 2/2009 | Derrenberger et al. |
| 7,500,176 B2 | 3/2009 | Thomson et al. |
| 7,877,290 B1 | 1/2011 | Arsenault et al. |
| 8,027,568 B1 | 9/2011 | Abecassis |
| 2001/0007149 A1 | 7/2001 | Smith |
| 2002/0010930 A1 | 1/2002 | Shah-Nazaroff et al. |
| 2002/0049972 A1 | 4/2002 | Kimoto |
| 2002/0053089 A1 | 5/2002 | Massey |
| 2002/0059602 A1 | 5/2002 | Macrae et al. |
| 2002/0066071 A1 | 5/2002 | Tien et al. |
| 2002/0069413 A1 | 6/2002 | Levitan |
| 2002/0073424 A1 | 6/2002 | Ward, III et al. |
| 2002/0092017 A1 | 7/2002 | Klosterman et al. |
| 2002/0095676 A1 | 7/2002 | Knee et al. |
| 2002/0103701 A1 | 8/2002 | Mowry |
| 2002/0120933 A1 | 8/2002 | Knudson et al. |
| 2003/0025807 A1 | 2/2003 | Roberts et al. |
| 2003/0135853 A1 | 7/2003 | Goldman et al. |
| 2006/0212900 A1* | 9/2006 | Ismail et al. ............... 725/34 |
| 2008/0046920 A1 | 2/2008 | Bill |
| 2008/0189735 A1 | 8/2008 | Barton et al. |
| 2010/0122286 A1* | 5/2010 | Begeja et al. .............. 725/34 |
| 2011/0007197 A1 | 1/2011 | Palmer et al. |
| 2011/0016396 A1* | 1/2011 | Maruyama ............... 715/716 |
| 2012/0079382 A1* | 3/2012 | Swenson et al. .......... 715/716 |

OTHER PUBLICATIONS

Tseng et al. "Video personalization and summarization system for usage environment," ScienceDirect-Journal of Visual Communication and Image Representation, htt://www.sciencedirect.com/science/article/pii/S104732030400032X, Sep. 8, 2004, retrieved from the Interent on Jun. 1, 2011, 2 pages.

"Video Personalization at its Best: Havana Club Campaign," Stupeflix Blog, http://blog.stupeflix.com/video-personalization/, Nov. 9, 2010, retrievied from the Internet on Jun.1, 2011, 6 pages.

"Magicomm LLC—Variable Video," http://www.magicomm.biz/variable-video.phtml, 2009, retrived from the Interent on Jun. 1, 2011, 1 page.

Real Time Content, http://www.realtimecontent.com/index.php, retrieved from the Internet on Jun. 1, 2011, 14 pages.

Tseng et al. "Video personalization and summarization system," citeulike, http://www.citeulike.org/group/18/articles/158236, retrieved from the Internet on Jun. 1, 2011, 3 pages.

Kidwai, "3 easy ways to personalization video messages," iMedia Connection, http://www.imediaconnection.com/printpage/printpage.aspx?id=123671, Jul. 6, 2009, retreieved from the Internet on Jul. 1, 2011, 2 pages.

"XMPie, one to one in one," A Xerox Company brochure, XMPie, 2011, 28 pages.

Cary Sherburne, "AT&T Uses Personalized Video to Explain Mobile Bills," What They Think, http://whattheythink.com/articles/64334-t-uses-personalized-video-explain-mobile-bills/?printmode, dated Jul. 12, 2013, 3 pages.

* cited by examiner

SYSTEMS AND METHODS FOR VARIABLE VIDEO PRODUCTION, DISTRIBUTION AND PRESENTATION

FIELD OF THE DISCLOSURE

This disclosure relates generally to advertising and entertainment, and, more particularly, to systems and methods for variable video production, distribution and presentation.

BACKGROUND

Marketing companies may desire to communicate with potential customers via personalized messaging such as personalized video. To create a marketing campaign directed toward many customers using personalized videos, marketers may produce large sets of distinct but related versioned videos. Production of discrete sets of videos requires both massive manual replication of identical content and error prone manual personalization of each variant to achieve true relevant variability across the entire set of videos.

DETAILED DESCRIPTION

Figure 1:
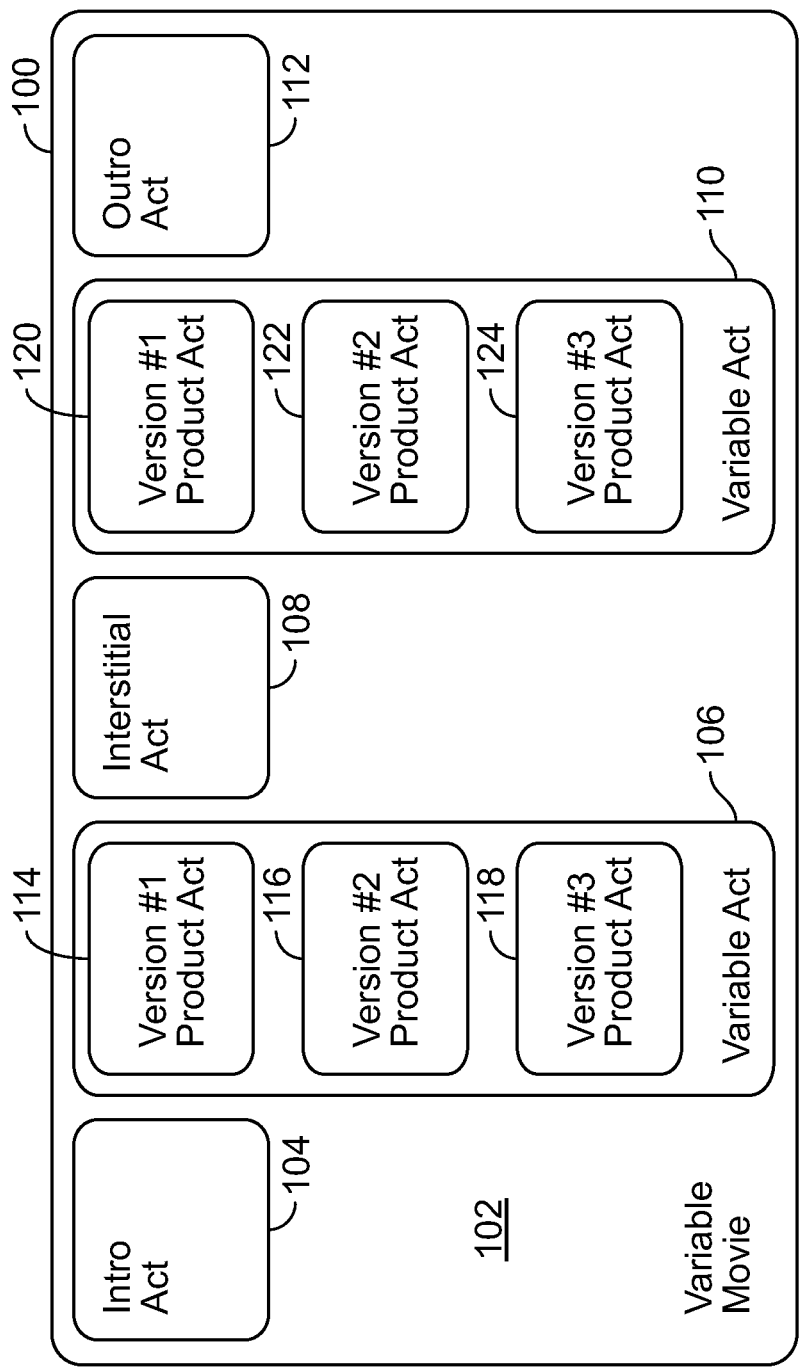
FIG. 1 is a block diagram of an example outline of a variable video.

Targeted marketing that leverages personalized content tailored to characteristics, tastes, styles, personality and/or habits of an intended recipient (such as, for example, an intended viewer) is more engaging for the intended viewer than generic marketing. Highly relevant communications can be geared toward the intended viewer and more effectively convey information to the intended viewer than non-targeted communications. Video is a highly effective medium of communication because the format is rich and highly immersive. Video engages potential and intended viewers of a communication (such as, for example, customers), enhances messages and enlivens brands. Employed together, highly relevant content and immersive video dramatically lift direct marketing response and conversion rates of potential customers for product(s), service(s) and/or business(es) featured in a communication (e.g., an advertisement). The examples disclosed here make integrating relevant variable video into a direct marketing program easy, practical and inexpensive. Some examples provide a scalable easily integrated fully automated web-based video-publishing platform that generates variable videos on demand. The examples disclosed here include a tool for building variable videos, a system for dynamically assembling variable videos and a mechanism for on demand delivery and playback of the variable videos to intended viewers.

Disclosed herein are at least two components, a composer tool that builds videos and a player tool that dynamically assembles the videos in real time (e.g., at the time of video playback using, for example pre-buffering) from component media elements or assets (e.g., video clips, audio clips, still photography, voice-overs, animations, etc.) and delivers the videos on demand. Together, the composer and the player and the dynamic composition they enable offer a workflow for leveraging variability in versioned, customized, and personalized video content. In addition, these variable videos may also be used directly as educational and/or product recommendation tools. These variable videos may be used as vehicles for delivering further marketing or other messages such as, for example, messages residing on personal URLs (personal uniform resource locators).

The examples disclosed herein may be developed quickly and inexpensively because these examples may leverage a wide range of existing creative assets (the media assets) from music and voice-over to still photography and full motion video, for example. In addition, the videos developed with the examples disclosed herein are easy to edit, easy to update and easy for an intended viewer to navigate because the videos, including all possible variations of media composition, are described within a single file using a highly modular component based movie description language. In addition, some of the example videos disclosed herein are dynamically assembled or composited by pulling the media content/assets from a central database such as, for example, a network-based database such as a cloud. These examples facilitate varying individual assets (discrete components) based on predetermined relevance logic such as, for example, an intended viewer responses to one or more specific queries. Thus, one file defining the variable video may be used to assemble, composite and play back different video variants to a particular viewer based on the viewer's metadata and/or on the viewer dynamic responses to one or more queries. Therefore, a single file includes all the description needed for variability and presentation. There is also a cloud of assets associated with the single file that is described by and supported by the file, but the individual assets of the cloud are not actually fully included in the file itself.

The examples disclosed herein provide videos that are highly relevant to the targeted viewer, provoke multiple levels of viewer engagement, provide consistent brand presentation (for the company generating the videos) and an enhanced personalized viewer experience.

An example composer application to author a variable video disclosed herein includes a builder to create a plurality of scenes and a content retriever to assign content to each of the plurality of scenes. The example composer also includes a library interface to point to the content for each of the plurality of scenes and a labeler to tag each of the plurality of scenes with at least one vector based on the content. Example vectors include characteristics of an intended viewer or target audience (e.g., sex, age, etc.), demographic or financial information (e.g., income, etc.), properties or qualities of a product, service, location, store, brand, company or organization (e.g., price point, reputation, geographic area of distribution or service, etc.), geographic location of the intended viewer and/or any other suitable criteria used by marketers, for example, to target or aim a presentation to a specific audience. In addition, the example composer includes a receiver to obtain first relevance data from first intended viewer of a first version of the variable video and to obtain second relevance data from a second intended viewer of a second version of the variable video. A mapper is included in the example composer to chart a first sequence of two of more of the plurality of scenes based on the at least one vector and the first relevance data and to chart a second sequence of two of more of the plurality of scenes based on the at least one vector and the second relevance data. Also, the example composer includes a publisher to publish the variable video as a single movie description file and supporting media element files based on the first sequence and the second sequence.

In some examples, a first component of a scene is tagged with a first vector and a second component of the scene is tagged with a second vector.

In some examples, the relevance data is demographic data.

In some examples, the content includes two or more of video, animation, voice-over, text, branding (e.g., logo(s), trade name(s), trademark(s), service mark(s), trade dress, insignia or an entity, and/or any other source identifier), audio, still photography and/or other suitable content. Also, in some examples, the content includes still photography and photo animation techniques including panning and/or zooming and/or transition effects. In addition, in some examples, the content includes a personal uniform resource locator. Furthermore, in some examples, the content is stored on a network and the library interface is communicatively coupled to the network.

In some examples, the builder is to use a drag and drop technique to create the plurality of scenes.

In some examples, the file is an extensible markup language file. In some examples, the file is compressed into a binary format to, for example, facilitate transmission of the file.

In some examples, the composer is to define the first sequence and the second sequence without compiling the content of the first sequence or the second sequence.

An example method of authoring a variable video is disclosed herein. The example method includes creating a plurality of scenes, assigning content to each of the plurality of scenes, pointing to the content for each of the plurality of scenes and tagging each of the plurality of scenes with at least one vector based on the content. The example method also includes obtaining first relevance data from first intended viewer of a first version of the variable video and obtaining second relevance data from a second intended viewer of a second version of the variable video. In addition, the example method includes charting a first sequence of two of more of the plurality of scenes based on the at least one vector and the first relevance data and to chart a second sequence of two of more of the plurality of scenes based on the at least one vector and the second relevance data. Furthermore, the example method includes publishing the variable video description, referencing the supporting assets, as a single file based on the first sequence and the second sequence.

Also disclosed herein is an example machine readable medium having instructions stored thereon, which when executed, cause a machine to at least create a plurality of scenes, assign content to each of the plurality of scenes, point to the content for each of the plurality of scenes and tag each of the plurality of scenes with at least one vector based on the content. The example instructions further cause a machine to obtain first relevance data from first intended viewer of a first version of the variable video and to obtain second relevance data from a second intended viewer of a second version of the variable video. In addition, the example instructions cause a machine to chart a first sequence of two of more of the plurality of scenes based on the at least one vector and the first relevance data and to chart a second sequence of two of more of the plurality of scenes based on the at least one vector and the second relevance data. Furthermore, the example instructions cause a machine to publish the variable video as a single file based on the first sequence and the second sequence.

An example video player to play a variable video is disclosed herein. The example player includes an input interface to receive first relevance data from a first intended viewer of a first version of the variable video and to receive second relevance data from a second intended viewer of a second version of the variable video. The example player also includes an assembler to assemble a first sequence of two or more of a plurality of scenes charted in a video file based on the first relevance data and at least one vector tagged to the plurality of scenes based on content of the plurality of scenes and to assemble a second sequence of two or more of the plurality of scenes charted in the video file based on the second relevance data and at least one vector.

In some examples, the variable video is embedded on a personal URL, which when read, causes the video to play. Also, in some examples, vector data may be rendered from a personal URL.

In some examples, the assembler is to read the first sequence and the second sequence from a single file. In some examples, the file is an extensible markup language file.

In some examples, the example player also includes a compiler to play the video. In such examples, the assembler assembles at least one of the first sequence or the second sequence, and the compiler plays at least one of the first sequence or the second sequence in real time or near real time.

In some examples, the plurality of scenes comprises a plurality of content, and the content is rendered as the assembler assembles at least one of the first sequence or the second sequence.

In some examples, the relevance data includes one or more of demographic data and/or user preferences.

In some examples, the assembler downloads a plurality of content from a network to assemble at least one of the first sequence or the second sequence.

In some examples, the first sequence includes first content and second content presented simultaneously, and the assembler modifies the presentation of the first content to match a duration of the second content. Also, in some examples, the second content is audio content.

In some examples, the assembler is to operate at a same geographic location as the playback user interface.

An example method to play a variable video is disclosed. The example method includes receiving first relevance data for a first intended viewer of a first version of the variable video and receiving second relevance data for a second intended viewer of a second version of the variable video. The example method also includes assembling a first sequence of two or more of a plurality of scenes charted in a video file based on the first relevance data and at least one vector tagged to the plurality of scenes based on content of the plurality of scenes and assembling a second sequence of two or more of the plurality of scenes charted in the video file based on the second relevance data and at least one vector.

Also disclosed herein is an example machine readable medium having instructions stored thereon, which when executed, cause a machine to at least request first relevance data from a first intended viewer of a first version of the variable video and request second relevance data from a second intended viewer of a second version of the variable video. The example instructions also cause a machine to assemble a first sequence of two or more of a plurality of scenes charted in a variable video file based on the first relevance data and at least one vector tagged to the plurality of scenes based on content of the plurality of scenes and assemble a second sequence of two or more of the plurality of scenes charted in the variable video file based on the second relevance data and at least one vector.

An example system to generate a variable video is disclosed. The example system includes a data center storing a plurality of media assets. The example system also includes a composer communicatively coupled to the data center over a network. The composer is to identify a first order of a first subset of the plurality of media assets for inclusion into a first variable video for a first viewer. In addition, the example system includes a player communicatively coupled over the network to the data center and mechanisms for preprocessing the file created by the composer that outlines the variable video and mechanisms that provide vectors of relevance. The player is to receive the first order, to download the first subset of media assets and to present the first variable video.

In some examples, the player is to download the first subset on demand. Also, in some examples, the player is to begin to present the first variable video before a portion of the first subset is downloaded.

In some examples, the composer is to identify a second order of a second subset of the plurality of media assets for inclusion into a second variable video for a second viewer, and the player is to receive the second order, to download the second subset of media assets and to present the second variable video.

In some examples, the composer is to change at least one of the assets to dynamically modify the first variable video. Also, in some examples, the composer is to change at least one of the assets after the player has begun to download the first subset. Thus, in some examples, the composer precomputes and encodes variability and personalization receivers into the file, and the player decides the variability and inserts the personalization using the vectors of relevance. Also, in some examples, the composer is dynamically communicating with the player. In addition, in some examples, the composer generated file is preprocessed by a secondary application on a server to enhance variability or personalization beyond what was originally encoded by the composer.

In some examples, the composer is to identify a change in the first subset based on a characteristic of an intended viewer. In addition, in some examples, the change in the first subset is determined prior to a download by the player. In some examples, the composer is to package the first order and the identified change into a file for receipt by the first viewer and a second viewer, and the change causes the first viewer to receive a first variable video and the second viewer to receive a second variable video, different from the first variable video, based on the same file. Furthermore, in some examples, the first variable video and the second variable video contain one or more different assets, and the first variable video and the second variable video are of the same duration. Also in some examples, the first variable video is of a first duration and the second variable video is of a second duration different than the first.

An example method to generate a variable video is disclosed. The example method includes storing a plurality of media assets at a first location on a network. The example method also includes identifying, at a second location on the network, a first order of a first subset of the plurality of media assets for inclusion into a first variable video for a first viewer. In addition, the example method includes receiving the first order at a third location on the network, downloading the first subset of media assets and presenting the first variable video.

Also disclosed herein is an example machine readable medium having instructions stored thereon, which when executed, cause a machine to at least store a plurality of media assets at a first location on a network. The example instructions further cause a machine to identify, at a second location on the network, a first order of a first subset of the plurality of media assets for inclusion into a first variable video for a first viewer. In addition, the example instructions cause a machine to receive the first order at a third location on the network, download the first subset of media assets, and present the first variable video.

An example system to produce a variable presentation is disclosed herein. The example system includes a database to store of plurality of media components and a reader to read a presentation file. In this example, the presentation file names a subset of the plurality of media components. The example system also includes a retriever to obtain the subset of media components from the database. In addition, the example system includes an arranger to organize the subset of media components as indicated in the presentation file for presentation to a first viewer. In this example, a first media component and a second media component of the subset of components are to be presented simultaneously to the first viewer as a first variable presentation. Furthermore, the example system includes a selector to a select a third media component from the subset to be presented simultaneously with the second media component to a second viewer as a second variable presentation.

In some examples, the first media component is based on a first characteristic of the first viewer, and the second media component is based on a second characteristic of the second viewer. Also, in some examples, the media components include one or more of video(s), animation(s), audio clip(s), still image(s), text(s) and/or logo(s).

In some examples, a database (as defined herein) is communicatively coupled to the retriever over a network such as, for example, the internet. The term "database" as used herein may refer to an interactive or a non-interactive compilation or collection of assets. In some examples, the database is a media library created and referenced externally via the variable video file. In such examples, assets are pulled or otherwise obtained from the library directly. In addition, in such examples, the assets referenced by the variable video file may be publicly published to the library for potential reference and use in variable video playback. The example library is a set of flat files that are available via an intermediate database or directly from the library such as, for example, via a library URL. In addition, the assets included in the database or library are assets that have been processed by, for example, the composer and comprise media that has been encoded such that the assets are primed or otherwise ready for distribution and incorporation into a variable video.

In some examples, the presentation file names both the media components for the first variable presentation and the media components for the second variable presentation.

In some examples, the presentation file does not need re-authoring between naming the media components for the first variable presentation and naming the media components for the second variable presentation.

In some examples, the selector is to select a fourth media component from the subset to be presented simultaneously with the second media component to the first viewer as a third variable presentation.

In some examples, the first viewer is located at a first location and the reader, the retriever and the arranger are located at the first location. Also, in some examples, the first variable presentation is rendered at the first location.

In some examples, the selector is to select a fourth media component from the subset to be presented simultaneously with the second media component to the first viewer as a third variable presentation. In such examples, the third variable presentation is rendered at the first location.

An example method to produce a variable presentation is disclosed. The example method includes storing of plurality of media components and reading a presentation file, where the presentation file names a subset of the plurality of media components. The example method also includes obtaining the subset of media components from the database and organizing the subset of media components as indicated in the presentation file for presentation to a first viewer. In such examples, a first media component and a second media component of the subset of components are to be presented simultaneously to the first viewer as a first variable presentation. The example method also includes selecting a third media component from the subset to be presented simultaneously with the second media component to a second viewer as a second variable presentation.

Also disclosed herein is an example machine readable medium having instructions stored thereon, which when executed, cause a machine to at least store a plurality of media components and read a presentation file, where the presentation file names a subset of the plurality of media components. The example instructions also cause a machine to obtain the subset of media components from the database and organize the subset of media components as indicated in the presentation file for presentation to a first viewer. In such examples, a first media component and a second media component of the subset of components are to be presented simultaneously to the first viewer as a first variable presentation. In addition, the example instructions cause a machine to select a third media component from the subset to be presented simultaneously with the second media component to a second viewer as a second variable presentation.

Another example system to produce a variable presentation is disclosed. The example system includes a composer to create a first description of a first set of media components for inclusion in a first variable presentation and for inclusion in a second variable presentation. In such examples, the composer is to create a second description of a second set of media components for inclusion in the first variable presentation. Also, the example composer is to create a third description of a third set of media components for inclusion in the second variable presentation. Furthermore, the example composer is to define a query to determine a selection between the second set of media components and the third set of media components. The example system also includes an output to produce a single file containing first, second and third descriptions and the query. In addition, the example system includes a player to read the single file, obtain the first set of media components, and obtain one of the second set of media components or the third set of media components based on the query.

In some examples, the player is to compile the first variable presentation or the second variable presentation using the first media components and one of the second set of media components or the third set of media components. Also, in some examples, the player is to intersperse a portion of the first media components with a portion of the second media components or the third media components.

In some examples, the composer is located in a first location, the player is located in a second location, and the player renders one or more of the first variable presentation or the second variable presentation at the second location.

In some examples, an intended viewer determines the selection based on the query.

In some examples, the single file is an extensible markup language file.

In some examples, the query is to determine a selection between the second set of media components, the third set of media components and a fourth set of media components.

In some examples, the composer to create a fourth description of a fourth set of media components for inclusion in one or more of the first variable presentation or the second variable presentation. In such examples, the composer also is to create a fifth description of a fifth set of media components for inclusion in one or more of the first variable presentation or the second variable presentation. In addition, the example composer is to define a second query to determine a selection between the fourth set of media components and the fifth set of media components.

In some examples, the player is to play one of the first variable presentation or the second variable presentation. Also, in some examples, the player is to play at least a portion of the first set of media components simultaneously with one of the second set of media components or the third set of media components.

Another example method to produce a variable presentation is disclosed. The example method includes creating a first description of a first set of media components for inclusion in a first variable presentation and for inclusion in a second variable presentation, creating a second description of a second set of media components for inclusion in the first variable presentation and creating a third description of a third set of media components for inclusion in the second variable presentation. In addition, the example method includes defining a query to determine a selection between the second set of media components and the third set of media components. Also, the example method includes producing a single file containing first, second and third descriptions and the query and reading the single file. Furthermore, the example method includes obtaining the first set of media components and obtaining one of the second set of media components or the third set of media components based on the query.

Also disclosed herein is another example machine readable medium having instructions stored thereon, which when executed, cause a machine to at least create a first description of a first set of media components for inclusion in a first variable presentation and for inclusion in a second variable presentation, create a second description of a second set of media components for inclusion in the first variable presentation and create a third description of a third set of media components for inclusion in the second variable presentation. The example instructions also cause a machine to define a query to determine a selection between the second set of media components and the third set of media components. In addition, the example instructions cause a machine to produce a single file containing first, second and third descriptions and the query and read the single file. Furthermore, the example instructions cause a machine to obtain the first set of media components and obtain one of the second set of media components or the third set of media components based on the query.

Another example system to produce a variable presentation is disclosed. The example system includes a detector to detect a first duration of a first media component, a second duration of a second media component and a third duration of a third media component. The example system also includes an aggregator to combine the first media component with the second media component to create a first variable presentation and to combine the first media component with the third media component to create a second variable presentation. In addition, the example system includes an adjustor to adjust the first media component to match the second duration for the first variable presentation and to adjust the first media component to match the third duration for the second variable presentation.

In some examples, the first media component is one or more of a video, an animation, a photograph, a text, a brand and/or a logo and the second media component and third media component are audio. Also, in some examples, the adjustor is to compact or expand the first media component. In addition, in some examples, the adjustor is to zoom and/or pan.

In some examples, the second media component is audio in a first language and the third media component is audio in a second language different from the first language.

In some examples, the first media component is audio and the second media component and the third media component are each one or more of a video, an animation, a photograph, a text, a brand and/or a logo. In such examples, the adjustor is to adjust the second media component to the first duration for the first variable presentation and to adjust the third media component to the first duration for the second variable presentation.

In some examples, the adjustor is to compact and/or expand one or more of the second media component and/or the third media component.

In some examples, the second media component and the third media component are personalized messages to a first intended viewer and a second intended viewer, respectively.

In some examples, the aggregator is to switch between the second media component and the third media component. Also, in some examples, the adjustor is to automatically change the duration of the first media component between the second duration and the third duration.

In some examples, the detector is to detect a fourth duration of a fourth media component, a fifth duration of a fifth media component and a sixth duration of a sixth media component. In such examples, the aggregator is to combine the fourth media component with the fifth or sixth media components to create the first or second variable presentations, and the adjustor is to adjust the duration of the fourth media component to match either the fifth duration or the sixth duration.

Also disclosed is another example method to produce a variable presentation. The example method includes detecting a first duration of a first media component, a second duration of a second media component and a third duration of a third media component. The example method also includes combining the first media component with the second media component to create a first variable presentation and combining the first media component with the third media component to create a second variable presentation. In addition, the example method includes adjusting the first media component to match the second duration for the first variable presentation and adjusting the first media component to match the third duration for the second variable presentation.

Also disclosed herein is another example machine readable medium having instructions stored thereon, which when executed, cause a machine to at least detect a first duration of a first media component, a second duration of a second media component and a third duration of a third media component. The example instructions further cause a machine to combine the first media component with the second media component to create a first variable presentation and combine the first media component with the third media component to create a second variable presentation. In addition, the example instructions cause a machine to adjust the first media component to match the second duration for the first variable presentation and adjust the first media component to match the third duration for the second variable presentation.

Turning now to the figures, FIG. 1 is a block diagram of an example outline of a variable video 100. In this example, a single file 102 outlines nine possible variations of a video. The variable video 100 includes an introduction 104, a first variable act 106, an interstitial act 108, a second variable act 110 and an ending 112. In this example, the introduction 104, the interstitial act 108 and the ending 112 are non-variable. In this example, all nine of the possible variations of the variable video 100 receive the introduction 104, the interstitial act 108 and the ending 112. Different intended viewers or viewers may receive different versions of the video. Viewer data or relevance data and vectors, as described in greater detail below, determines the path through the video, i.e., what version the viewer is to receive.

In the example variable video 100 of FIG. 1, the first variable act 106 has a first variation 114, a second variation 116 and a third variation 118. Also, the second variable act 110 has a fourth variation 120, a fifth variation 122 and a sixth variation 124. The variable video 100 produced from the file 102 may include any combination of one of the first, second or third variations 114, 116, 118 and one of the fourth, fifth or sixth variations 120, 122, 124. Thus, the nine possible variable videos 100 creatable from this single file 102 include: (1) intro, variation 1, interstitial, variation 4, ending; (2) intro, variation 1, interstitial, variation 5, ending; (3) intro, variation 1, interstitial, variation 6, ending; (4) intro, variation 2, interstitial, variation 4, ending; (5) intro, variation 2, interstitial, variation 5, ending; (6) intro, variation 2, interstitial, variation 6, ending; (7) intro, variation 3, interstitial, variation 4, ending; (8) intro, variation 3, interstitial, variation 5, ending; and (9) intro, variation 3, interstitial, variation 6, ending. Though two variable acts each with three possible variations are shown in FIG. 1, other examples could include any number of variable acts having any number of variations. Thus, the single file 102 could potentially outline a limitless number of possible variable videos.

Figure 2:
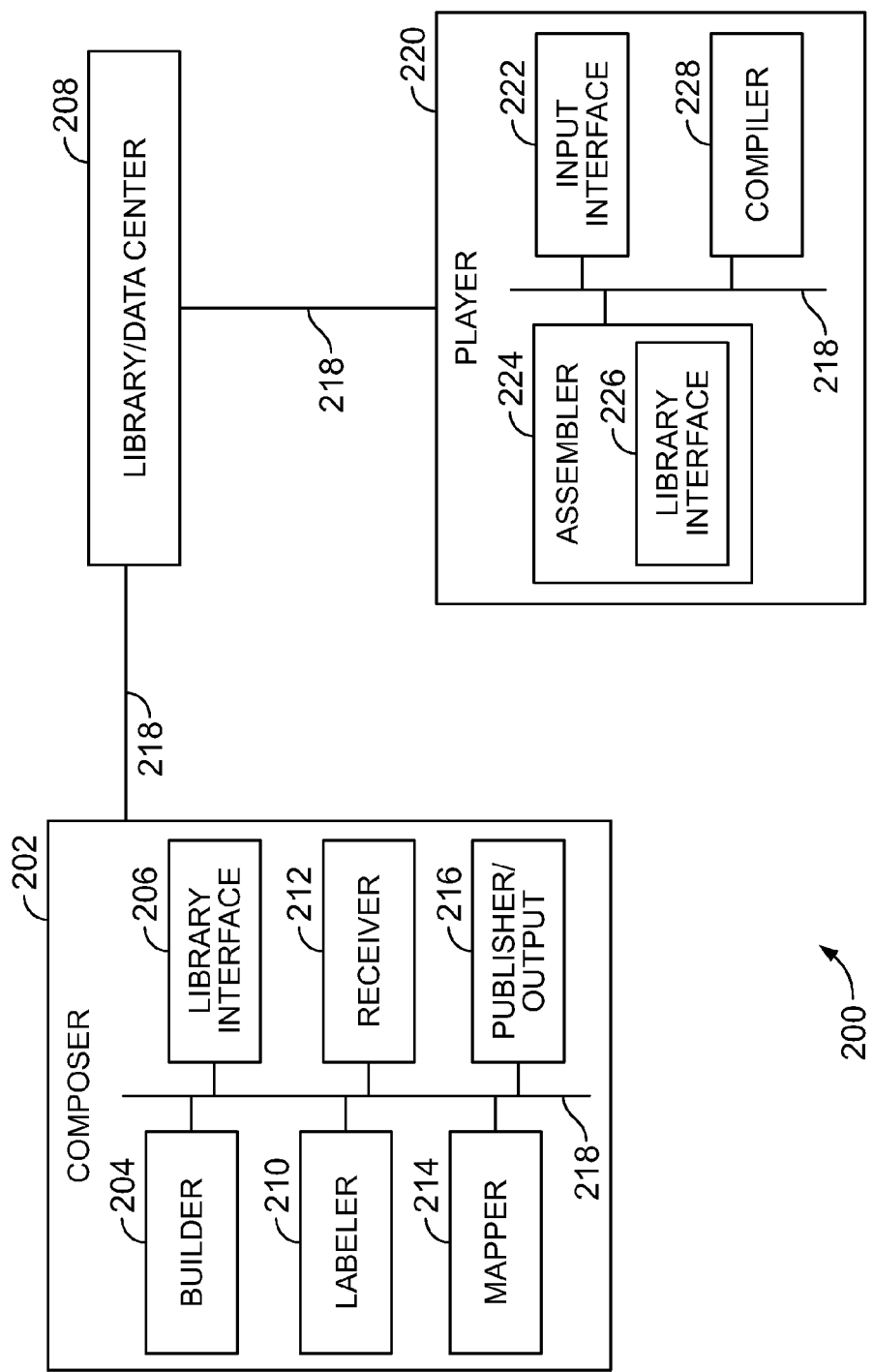
FIG. 2 is a block diagram of an example system to compose and play a variable video.

FIG. 2 is a block diagram of an example system 200 to compose and play a variable video. The example system 200 includes a composer 202 to author the variable video. The composer 202 creates a description a set of media components, content or assets for inclusion in a first variable presentation. The composer 202 includes a builder 204 to create a plurality of scenes. The builder 204 outlines a number of scenes and any variations to a scene. A content retriever, which may be integral with or communicatively coupled to the builder 204 defines or assigns what media components or assets are to appear in each scene. The builder 204 is also used to define a duration of each scene and/or a whole video. The builder 204 is further used to define how an asset is to be presented during a scene. For example, a scene defining a still photograph may include a fading and/or a panning or zoom of the photograph for the duration of the scene. The builder 204 may be used to define where on the photograph the pan is to begin and where the pan is to end.

The example system 200 also includes a library interface 206 to point to the media content or assets for each of the plurality of scenes. The library interface 206 in coupled to a library or data center 208 which may be, for example, a network-based database, a cloud, a local storage or any other suitable database for storing available media assets. In addition, the library interface 206 may be used to upload additional media assets for inclusion with the library 208.

The example system 200 also includes a labeler 210 to tag each of the plurality of scenes with at least one vector based on the media asset. For example, the labeler 210 may tag a scene with a vector such as, for example, "female" for a scene that is intended to be included in a version of the video intended for a female viewer. The labeler 210 may tag a scene with a "male" vector for a scene for intended for a male viewer. The vectors could be any type of descriptor, tag or metadata used to define the scene, as aspect of the video, a characteristic of an intended viewer or other means of defining the variability of the video. Also, a scene may include a plurality of components such as, for example, a video component and an audio component and a first component of a scene may be tagged with a first vector and a second component of the scene may be tagged with a second vector. Thus, for example, a video may be tagged as "male" and intended for male viewers, and an audio component may be tagged with a vector such as "rock" and intended for younger viewers.

In addition, the example system includes a receiver 212 to obtain relevance data from intended viewers of the variable video. The relevance data relates to the vectors and is used to determine what vectors are followed when the file is executed. For example, an intended viewer may be asked to indicate if the viewer is male or female. The viewer's response is the relevance data that is used to determine what version of the variable video the viewer will receive. The relevance data may be demographic data, data regarding a viewer's interests or habits, or any other data related to a viewer. The composer 202 may be used to form the query or queries that are used to prompt the intended viewer to provide the relevance data and define the vectors. A mapper 214 charts chart a sequence of the scenes based the vectors and the relevance data. Thus, for example, if a viewer indicates that he is a male, the mapper charts a sequence of scenes that are tagged with male vectors based on the receipt of the relevance data that the viewer is a male. The example composer 202 also includes a publisher or output 216 that publishes the variable video as a single file based on the sequence(s) charted by the mapper 214. The publisher 216 publishes a single file such as, for example, an extensible markup language file, which includes multiple possibilities of charted or chartable sequences. Publication of the file could include an embedded uniform resource locator, and the video may instantaneously publish on the internet. The composer can define the sequence and publish the file with without compiling the content/assets of the sequence. In addition, the same video file can be used to present different videos to different viewers based on the different relevance data and vectors outlined in the file.

In the example system 200 of FIG. 2, the components are communicatively coupled to other components of the example system 200 via communication links 218. The communication links 218 may be any type of wired (e.g., a databus, a USB connection, etc.) or wireless communication mechanism (e.g., radio frequency, infrared, etc.) using any past, present or future communication protocol (e.g., Bluetooth, USB 2.0, etc.). Also, the components of the example system 200 may be integrated in one device or distributed over two or more devices.

The example system 200 also includes a video player 220 to play a variable video, such as, for example, the variable video built by the composer 202. The example player 220 includes an input interface 222 to request response to queries from the intended viewer which form the relevance data used to define the scene sequence for the variable video. The example player 220 also includes an assembler 224 that assembles the sequence of scenes charted in the video file by the mapper 214 based on the relevance data and one or more vectors. The assembler 224 includes or is communicatively coupled to a library interface 226 to upload form a local storage or download from a network-based database (e.g., the library 208) the media content or assets used to assembly the scene sequence. Also, in some examples, the assembler 224 is to operate at a same geographic location as the user or input interface 222. For example, if the input interface 222 is an intended viewer's personal computer, the assembler 224 may also operate at the viewer's personal computer. In such examples, the variable video is assembled or stitched at the viewer's end. Also, in some examples, the composer 202 is at a second, different geographic location.

The example player 220 also includes a compiler 228 to play the video. The compiler 228 plays at least a portion of a scene sequence in real time or near real time as the assembler assembles the media assets for the scene sequence. Thus, in some examples, as the file defining the video is executed, content/assets are pulled from the cloud or otherwise downloaded or obtained while content/assets are compiled and played. In addition, in some examples, the content is rendered as the assembler assembles the scene sequence. Also, in some examples, one or more scenes may include two or more assets or media content presented simultaneously such as, for example, voiceover audio (first content) that plays while a related set of scenes also plays simultaneously (second content). In such examples, the assembler 224 selectively modifies the presentation of the second content to match a duration of the first content. In addition, in some examples, a first variable video for a first viewer and a second variable video for a second viewer contain one or more different asset(s). In such examples, a first video may use English voiceover audio and a second video may use Spanish voiceover audio. The English voiceover audio may be of a shorter duration than the Spanish voiceover audio. In such example, any variable duration media components (scenes) of the English video that are presented simultaneously with the English audio may be time adjusted (shortened or lengthened as necessary) so that the sum duration of the variable duration scenes and non-variable duration scenes presented simultaneously with the voiceover audio is at least and ideally the same duration as the English voiceover audio. Similar logic also holds true for the second variable video for the second viewer that employs the Spanish voiceover audio. These examples show that the acts are elastically scalable.

Also, in some examples, the player 220 downloads the scenes, i.e., a subset of the media content/assets available in the library 208, on demand. In some examples, the player 220 begins to present the variable video before the entire subset of media assets needed for the scene sequence (i.e., the video) is downloaded. In addition, the composer 202 may change one or more of the media assets mapped into the file to dynamically modify the variable video. The composer 202 may change the asset(s) after the player 220 has begun to download the first subset or prior to any activity by the player 220. In addition, the change in the asset(s) may result from a characteristic of the intended viewer as determined, for example, based on the relevance data.

Figure 3:
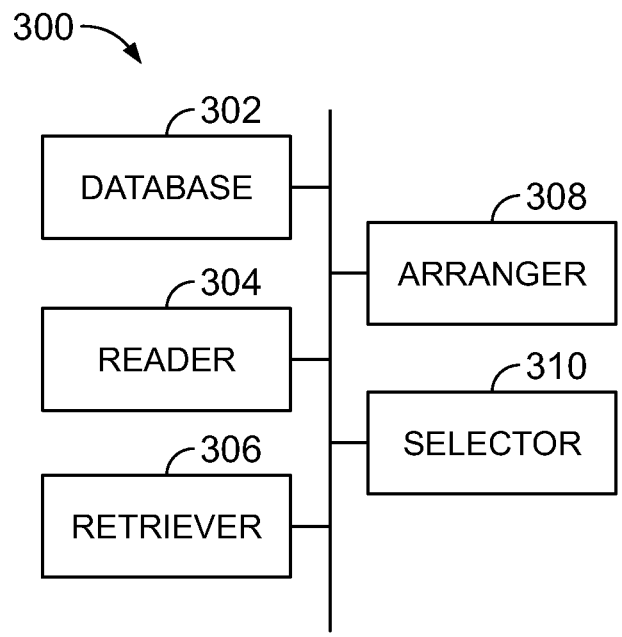
FIG. 3 is a block diagram of an example system to produce a variable presentation.

FIG. 3 illustrates another example system 300. The example system 300 is to produce a variable presentation, and the system 300 includes a database 302 that stores a plurality of media components, contents or assets. The media components include, for example, video(s), animation(s), audio, still image(s), text(s) and/or logo(s). The example system 300 also includes a reader 304 to read a presentation file. The presentation file names a subset of the plurality of media components to be included in the variable presentation.

The example system 300 also includes a retriever 306 to obtain the subset of media components from the database 302. The retriever 306 and the database 302 are communicatively coupled. In some examples, the retriever 306 and the database are coupled over a network such as, for example, the internet. In addition, the example system 300 includes an arranger 308 to organize the subset of media components as indicated in the presentation file for presentation to a viewer. In some examples, a first media component and a second media component of the subset of components are presented simultaneously to the first viewer as a first variable presentation.

In addition, the example system includes a selector 310 that selects an additional media component from the subset to be presented simultaneously with the second media component to a second viewer as an additional variable presentation. The selected media components are based on characteristics of the intended viewer.

In some examples, the presentation file names the media components for each variable presentation, and the presentation file does not need re-authoring between naming the media components for one variable presentation and naming the media components for another, different variable presentation. For example, no re-authoring is needed to change an audio component such as, for example, switching a first variable video from English to a second variable video that uses Spanish. Also, in some examples, an intended viewer is located at the same location as the reader 304, the retriever 306 and the arranger 308. Furthermore, the variable presentation for presentation to the intended viewer is rendered at the same location as the viewer.

Figure 4:
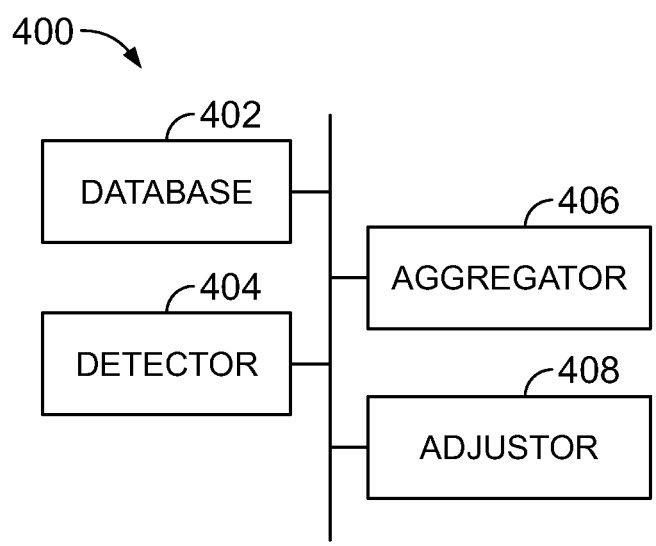
FIG. 4 is a block diagram of another example system to produce a variable presentation.
Figure 5:
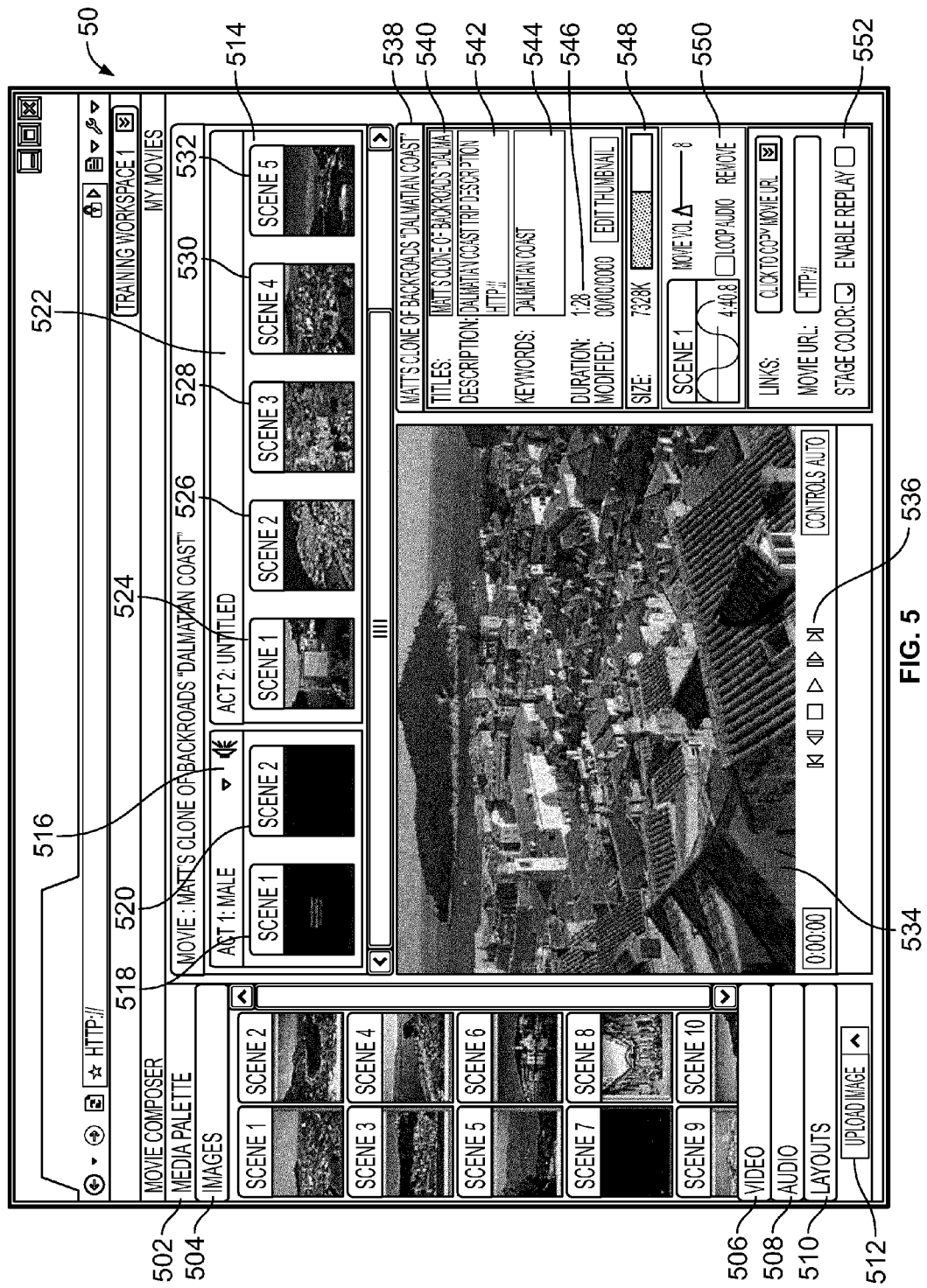
FIG. 5 is a first screen shot of an example interface showing an operation of the example systems of FIGS. 2-4.

FIG. 4 illustrates another example system 400 to produce a variable presentation. The example system 400 includes a database 402 that stores one or more media components, content or assets. As described herein, such media components may include, for example, one or more of video(s), animation(s), photograph(s), text(s), brand(s), logo(s), audio and/or personalized message(s) in one or more languages, and/or personal uniform resource locator(s).

The example system 400 also includes a detector 404 that detects durations of the media components. In addition, there is an aggregator 406 that combines the media components and creates the variable presentation(s).

Furthermore, the example system 400 includes an adjustor 408 that adjusts at least one of the media components to match the duration of another one of the media components to match the duration of a first variable presentation with the duration of a second variable presentation. To adjust one of the media components, the adjustor can compact or expand the media component. Example adjustment techniques also include zooming, panning and/or time stretching. In some examples, the adjustor 408 automatically adjusts the media components based on the durations detected by the detector 402.

FIGS. 5-9 are screen shots of an example interface showing example operations of the example systems of FIGS. 2-4 such as, for example, operations of the composer 202 of FIG. 2 as shown through an example user interface 500. The example includes a media palette 502, which shows a compilation of media components, content or assets. The media palette 502 may show a subset of the available media assets in, for example, the library 208. In this example, the media palette 502 is partitioned by media type (e.g., images 504, video 506, audio 508) and/or structure or layout 510. The media palette also includes an upload button 512 for adding additional media assets to the media palette 502 such as, for example, by uploading the asset(s) from a local source and/or downloading the asset(s) from a central database or cloud (e.g., the library 208).

The example interface 500 also includes a timeline panel 514. The timeline 514 shows the acts and scenes of a version of the variable video. In the example screenshot of FIG. 5, there is a first act 516, which a first scene 518 and a second scene 520 and a second act 522 with a first scene 524, second scene 526, third scene 528, fourth scene 530 and fifth scene 532. Media asset(s) from the media palette 502 are dragged and dropped into the acts and scenes 516-532 or between the acts and scenes 516-532 to create new acts or scenes and to edit the video.

The example interface 500 also includes a preview panel 534 to preview the video during any stage of production. The preview panel 534 includes buttons 536 for operating a video file such as, for example, rewind, fast forward, play, stop and pause.

The example interface 500 also includes a data panel 538. The example data panel 538 includes information about the variable video such as, for example, title 540, description 542, metadata or keywords, 544, duration 546, size 548, speed 550, and uniform resource location or internet address links 552.

Figure 6:
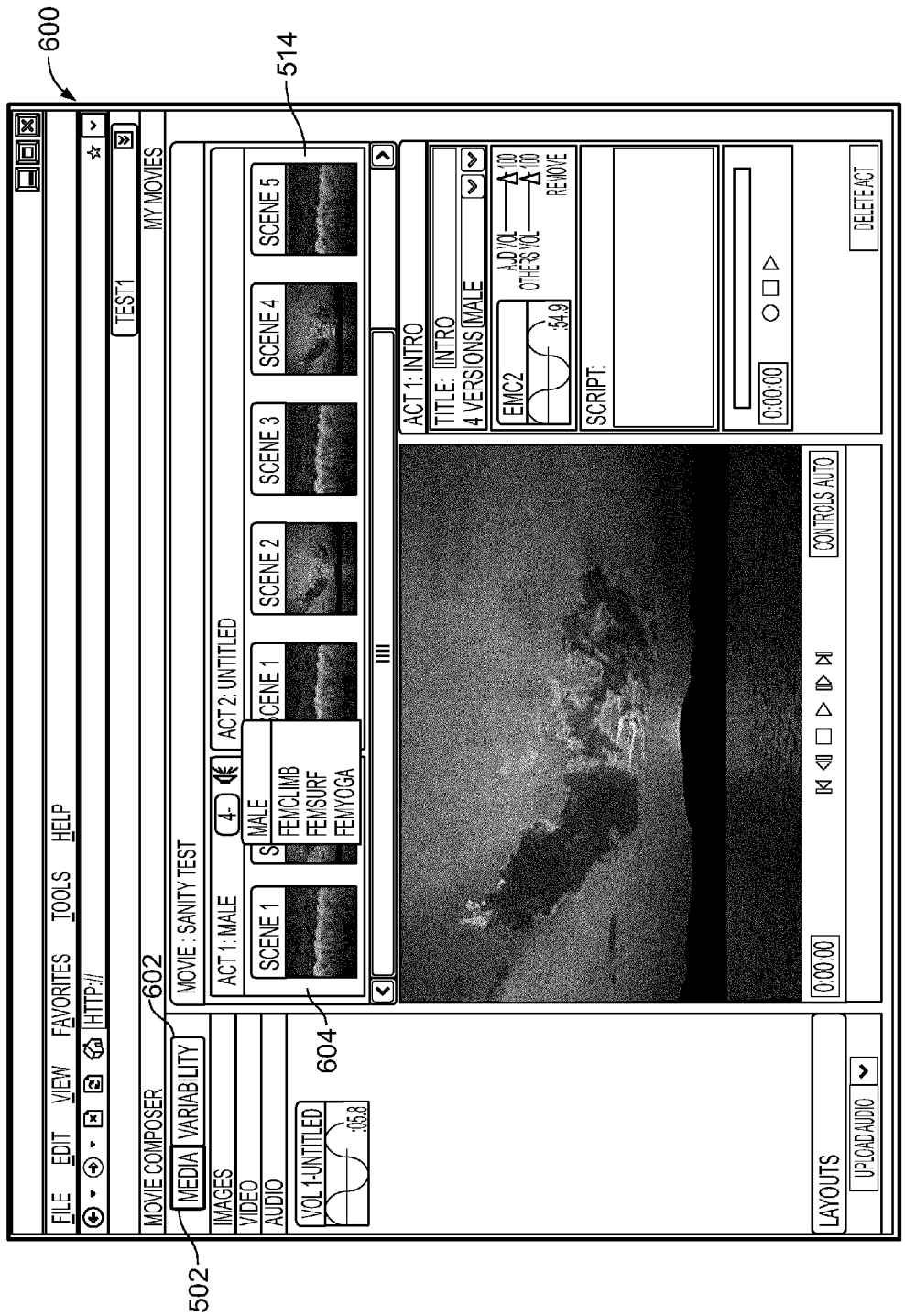
FIG. 6 is a second screen shot of an example interface showing an operation of the example systems of FIGS. 2-4.
Figure 7:
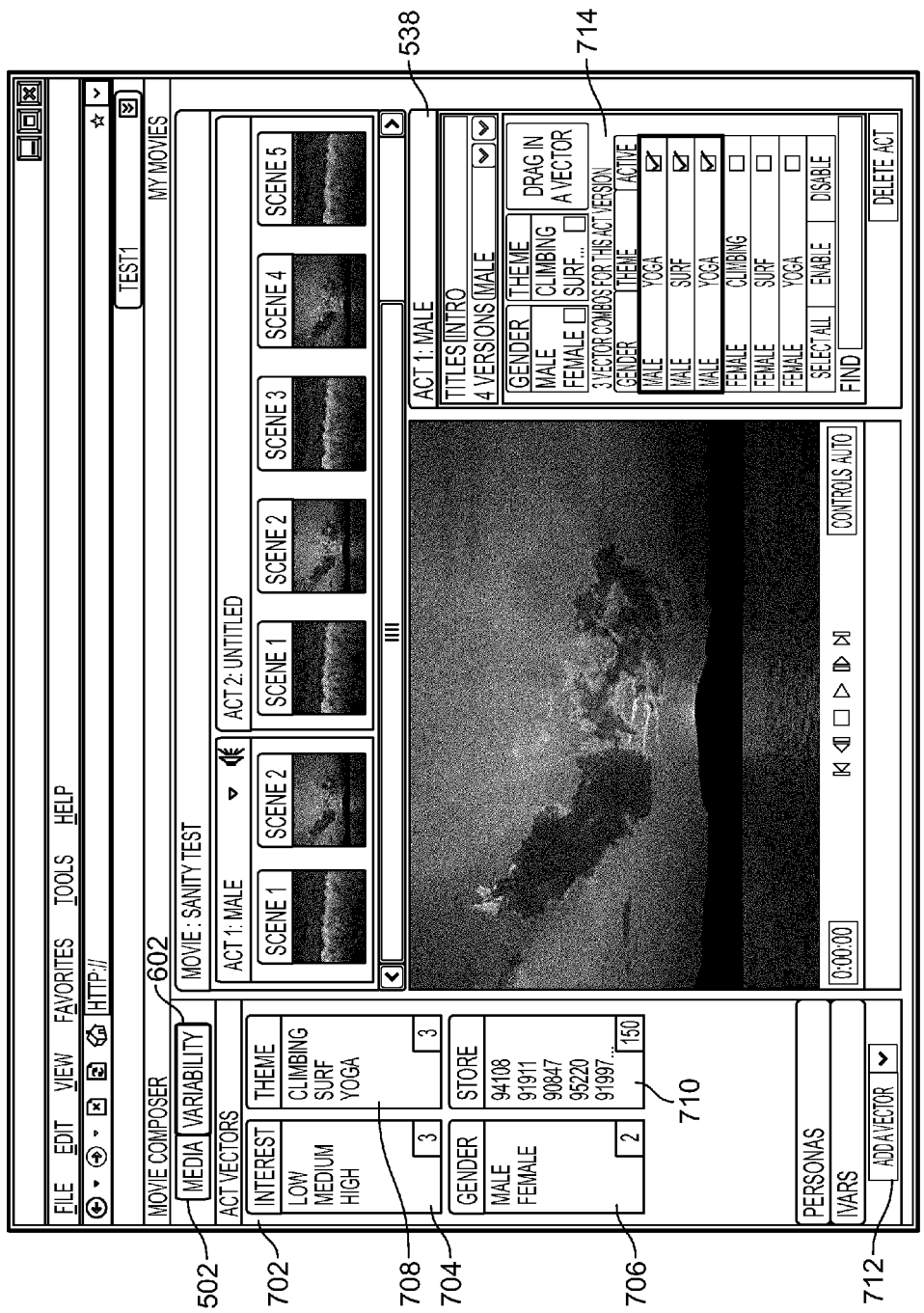
FIG. 7 is a third screen shot of an example interface showing an operation of the example systems of FIGS. 2-4.

FIG. 6 illustrates an example interface 600 used to incorporate variability into the video file. In the example interface 600, adjacent to the media palette 502, there is a variability tab 602. Selecting the variability tab 602 presents the variability panel 702 as shown in FIG. 7. The variability panel shows a plurality of vectors that may be used to create variability into a video produced from the file. In this example, there is a viewer interest or activity vector 704, a gender vector 706, a theme vector 708 based on viewer/viewer interest (e.g., climbing, surfing or yoga) and a geographic location vector 710 (shown as zip codes). Additional vectors may be defined such as, for example, by selecting the "Add a Vector" button 712 and then further defining an additional vector to be used to determine video variability. Though gender and interests of climbing, surfing and yoga are shown and described herein, the vectors may be based on any characteristic or information of any type that may be manipulated or otherwise utilized to create and/or define one group of intended viewers from another group of intended viewers and to introduce variability or further variability into the video file.

Figure 8:
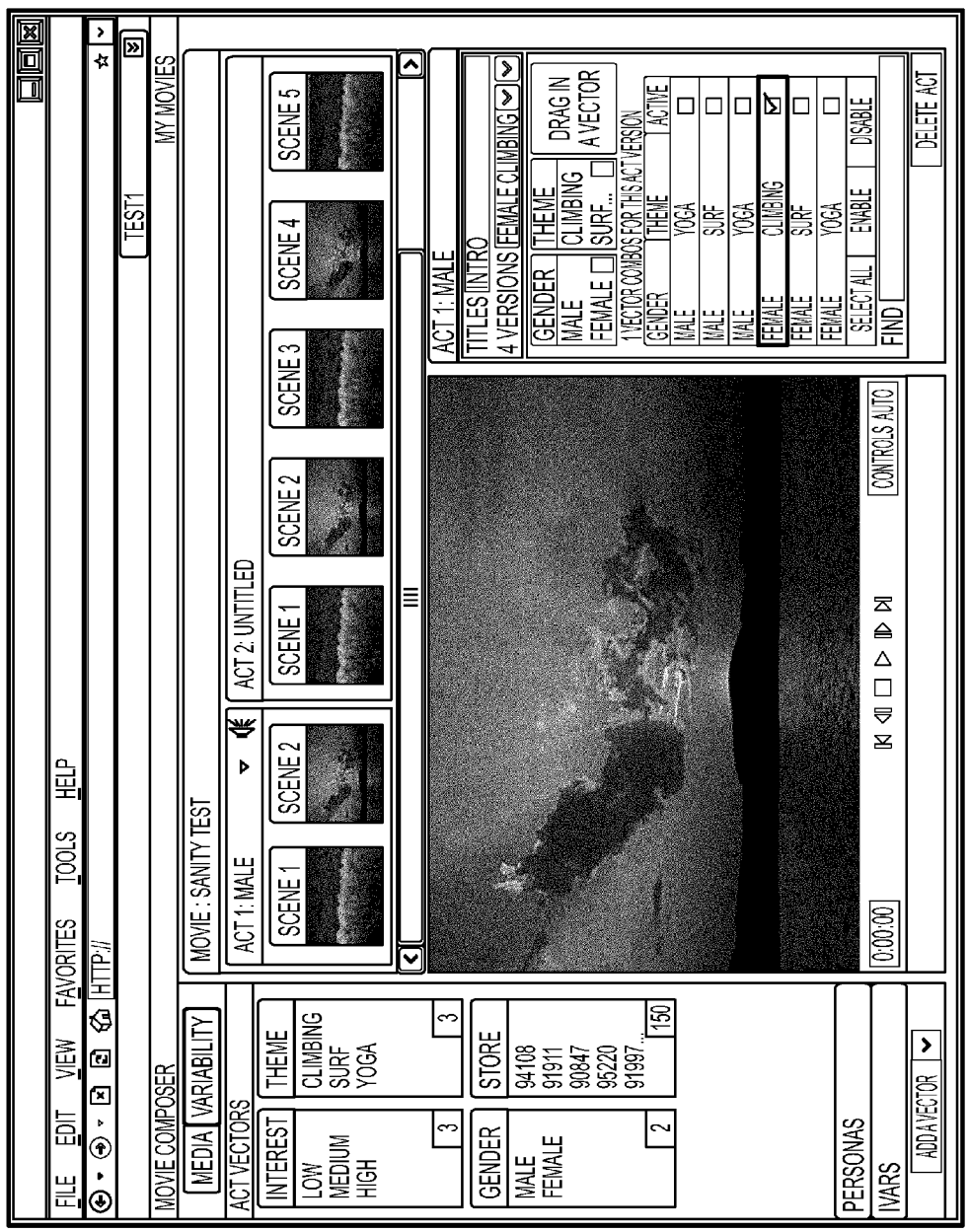
FIG. 8 is a fourth screen shot of an example interface showing an operation of the example systems of FIGS. 2-4.
Figure 9:
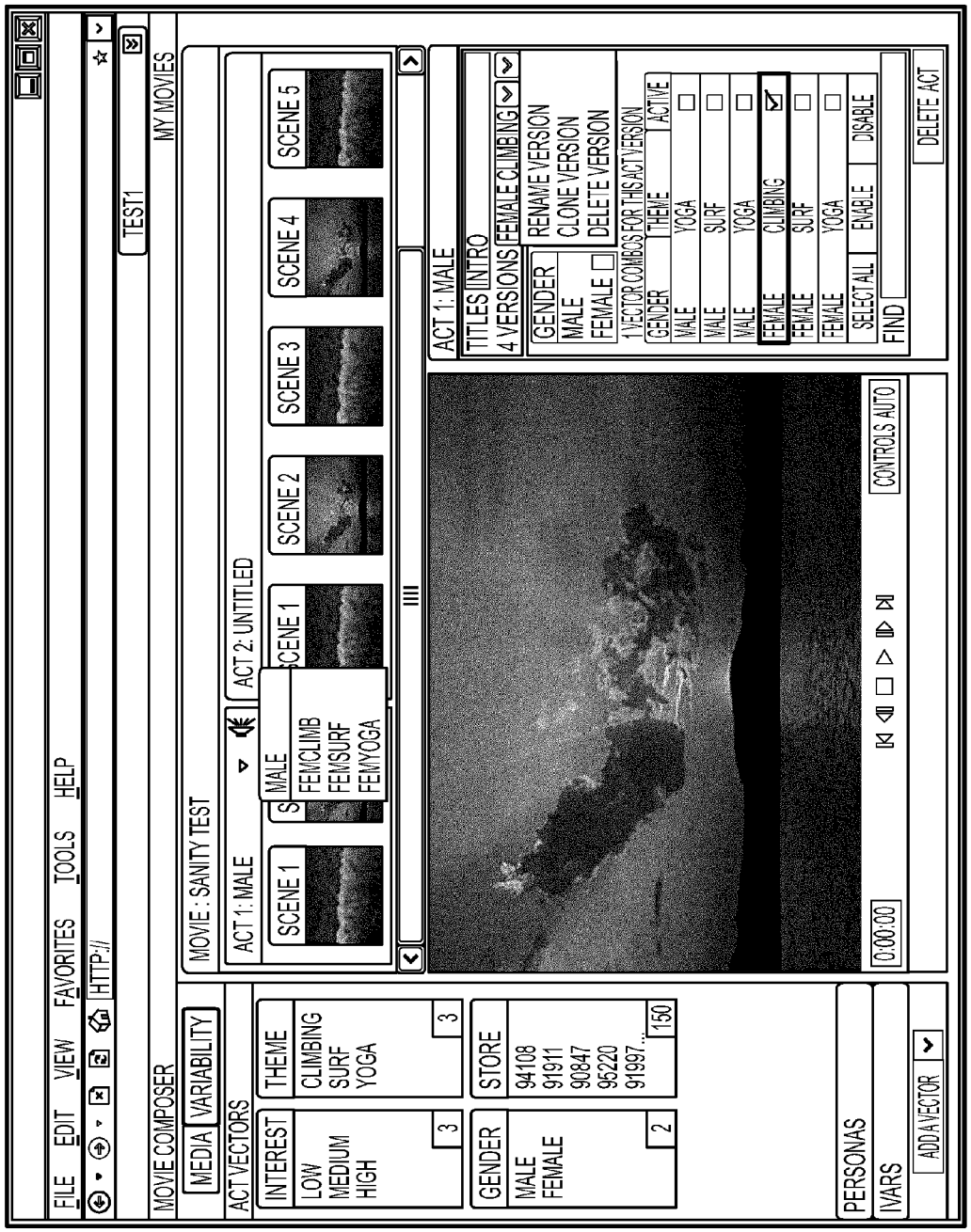
FIG. 9 is a fifth screen shot of an example interface showing an operation of the example systems of FIGS. 2-4.

As shown in FIG. 6, the acts and scenes may be defined based on the vector selection via the timeline 514. In this example, the introduction act 604 is defined as having four variations: one for all male viewers, one for females interested in climbing, one for females interested in surfing, and one for females interested in yoga. In addition, the data panel 538, as shown in FIG. 7 includes a vector setting panel 714, which is used to define what vectors apply to a particular act or scene. As shown in the example of FIG. 7, all combinations of vectors for males are selected for the introduction action, and, thus, all male viewers, regardless of their interest in climbing, surfing or yoga would receive the same act in their respective variable videos. Thus, the number of variable videos that are mappable in this single file are not based on the total number of possible combinations of the defined vectors, but rather on the variations the author chooses to define. FIGS. 8 and 9 show further examples, in which further variations are defined (in this example, a video for a female viewer who likes climbing).

Figure 10:
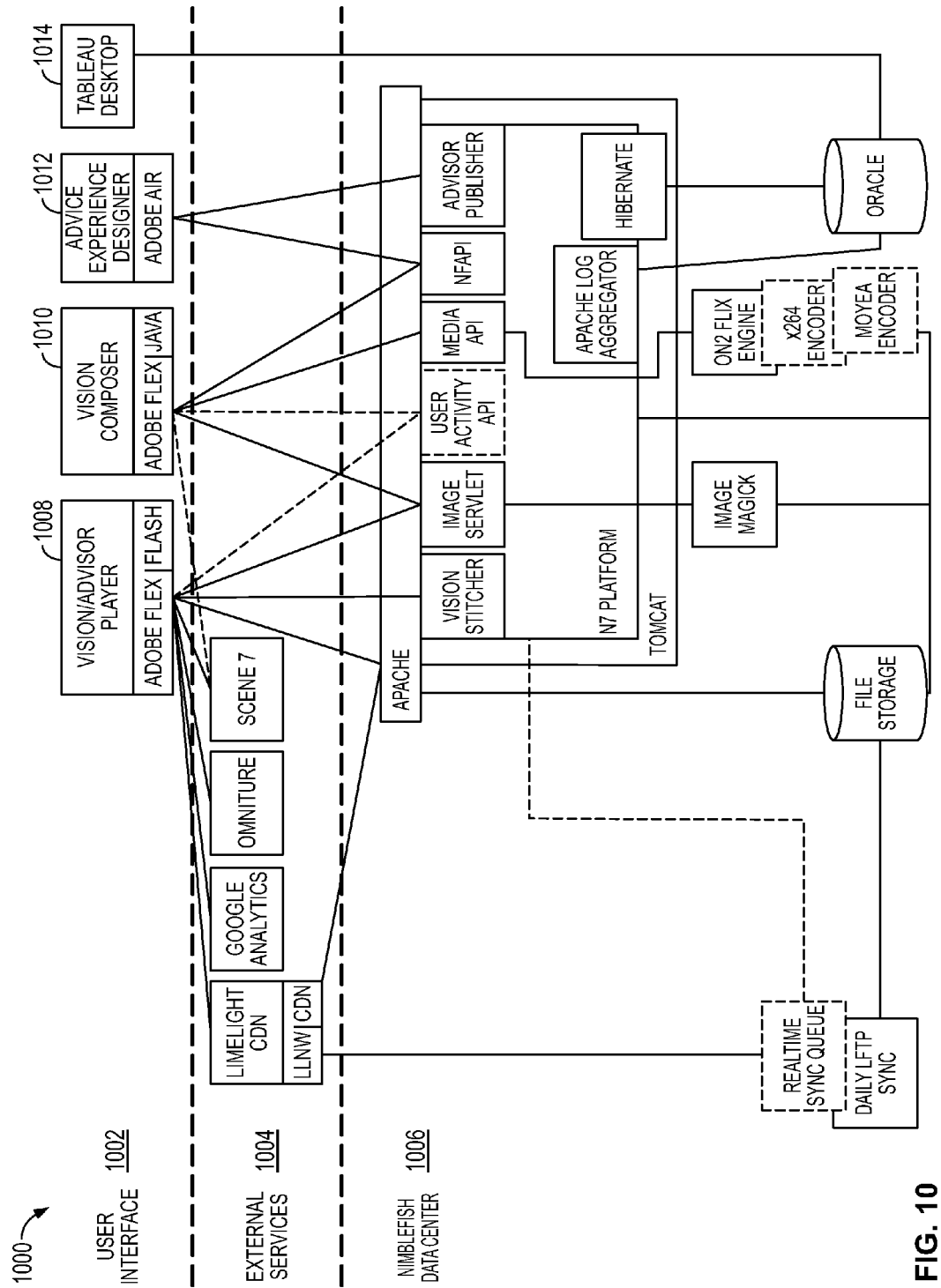
FIG. 10 is a block diagram of an example variable video production and playback platform.

FIG. 10 is a block diagram of an example platform 1000 for building and playing variable video. The example platform 1000 includes a plurality of user interfaces 1002, external or third party services 1004 and a central management platform 1006. The example user interfaces 1002 include a player 1008. The player 1008 compiles, arranges and sequences the media assets of a variable video for a particular variation for an intended viewer. The user interfaces 1002 also include a composer 1010, which is used to build, write and publish the variable video file, upload media assets and manage the assets. The composer 1010 is also used to write queries for prompting intended viewers to provide relevance data for use in reading and defining a variation of the variable video. The user interfaces 1002 may also include an advice or help interface 1012, which may be interactive or automated. In addition, the user interfaces 1002 may include a tableau desktop 1014 for managing statistics.

The external services 1004 include products or services that may be later consumed by the users during or after the composing or playing of the variable video. The management side 1006 may be used for bookkeeping, tracking user activity, tagging, transcoding and storing media assets and encoding the variable video file into the proper form for publishing.

While an example manner of implementing the example systems to produce and play variable video are described above, one or more of the elements, processes and/or devices illustrated in FIGS. 2-6 and 10 may be combined, divided, re-arranged, omitted, eliminated and/or implemented in any other way. Further, the example composer 202, the example builder 204, the example library interfaces 206 and 226, the example labeler 210, the example receiver 212, the example mapper 214, the example publisher/output 216, the example library/data center 208, the example player 220, the example input interface 222, the example assembler 224, the example compiler 228, the example databases 302 and 402, the example reader 304, the example, retriever 306, the example arranger 308, the example selector 310, the example detector 404, the example aggregator 406, the example adjustor 408, the example user interfaces 1002 and/or the example central management platform 1006 and/or, more generally, the example systems 200, 300, 400 and 1000 of FIGS. 2-4 and 10 may be implemented by hardware, software, firmware and/or any combination of hardware, software and/or firmware. Thus, for example, any of the example composer 202, the example builder 204, the example library interfaces 206 and 226, the example labeler 210, the example receiver 212, the example mapper 214, the example publisher/output 216, the example library/data center 208, the example player 220, the example input interface 222, the example assembler 224, the example compiler 228, the example databases 302 and 402, the example reader 304, the example, retriever 306, the example arranger 308, the example selector 310, the example detector 404, the example aggregator 406, the example adjustor 408, the example user interfaces 1002 and/or the example central management platform 1006 and/or, more generally, the example systems 200, 300, 400 and 1000 of FIGS. 2-4 and 10 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example composer 202, the example builder 204, the example library interfaces 206 and 226, the example labeler 210, the example receiver 212, the example mapper 214, the example publisher/output 216, the example library/data center 208, the example player 220, the example input interface 222, the example assembler 224, the example compiler 228, the example databases 302 and 402, the example reader 304, the example, retriever 306, the example arranger 308, the example selector 310, the example detector 404, the example aggregator 406, the example adjustor 408, the example user interfaces 1002 and/or the example central management platform 1006 and/or, more generally, the example systems 200, 300, 400 and 1000 of FIGS. 2-4 and 10 are hereby expressly defined to include a tangible computer readable medium such as a memory, DVD, CD, Blu-ray, etc. storing the software and/or firmware. Further still, the example systems 200, 300, 400 and 1000 of FIGS. 2-4 and 10 may include one or more elements, processes and/or devices in addition to, or instead of, those illustrated in FIGS. 2-4 and 10, and/or may include more than one of any or all of the illustrated elements, processes and devices.

Flowchart representative of example machine readable instructions for implementing the systems 200, 300, 400 and 1000 of FIGS. 2-4 and 10 are shown in FIGS. 11-16. In this example, the machine readable instructions comprise a program for execution by a processor such as the processor 1712 shown in the example computer 1700 discussed below in connection with FIG. 17. The program may be embodied in software stored on a tangible computer readable medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 11-16, many other methods of implementing the example systems 200, 300, 400 and 1000 may alternatively be used. For example, the order of execution of the blocks may be changed, and/or some of the blocks described may be changed, eliminated, or combined.

As mentioned above, the example processes of FIGS. 11-16 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 11-16 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 11:
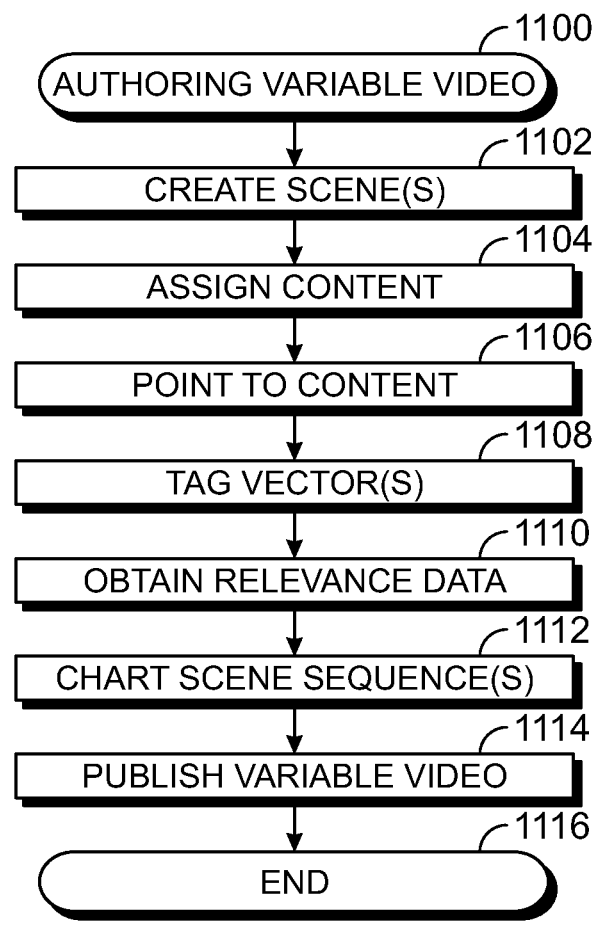
FIG. 11 is a flow chart representative of example machine readable instructions that may be executed to implement example systems disclosed herein.

FIG. 11 shows an example method of authoring a variable video 1100. The example method 1100 includes creating a plurality of scenes (block 1102) using for example, the example composer 202 of FIG. 2, the example builder 204 of FIG. 2 or the example composer 1010 of FIG. 10. The example method 1100 also includes assigning content to each of the plurality of scenes (block 1104) using, for example, the example builder 204 and/or content retriever of FIG. 2. In addition, the example method 1100 includes pointing to the content for each of the plurality of scenes (block 1106), using, for example, the example library interface 206 of FIG. 2. Also, the method includes tagging each of the plurality of scenes with at least one vector based on the content (block 1108) using, for example, the example labeler 210 of FIG. 2.

In the example method 1100, relevance data from an intended viewer of a version of the variable video is obtained (block 1110) using, for example, the receiver 212 of FIG. 2. Other relevance data may be obtained for additional and/or alternative intended viewers (block 1110). In addition, the example method 1100 includes charting a sequence of scenes based on the vector and the relevance data (block 1112) using, for example, the example mapper 214 of FIG. 2. In addition, another and/or alternative sequence of scenes may be charted (block 1112) based on a different vector and the same relevance data or the same vector and different relevance data or otherwise different metrics for establishing a map of the scenes for a variation of the video.

The example method 1100 also includes publishing the variable video (block 1114), using, for example, the publisher 216 of FIG. 2. The published video includes the different variations embodied in a single file. The example method 1100 ends (block 1116) until another video is authored.

Figure 12:
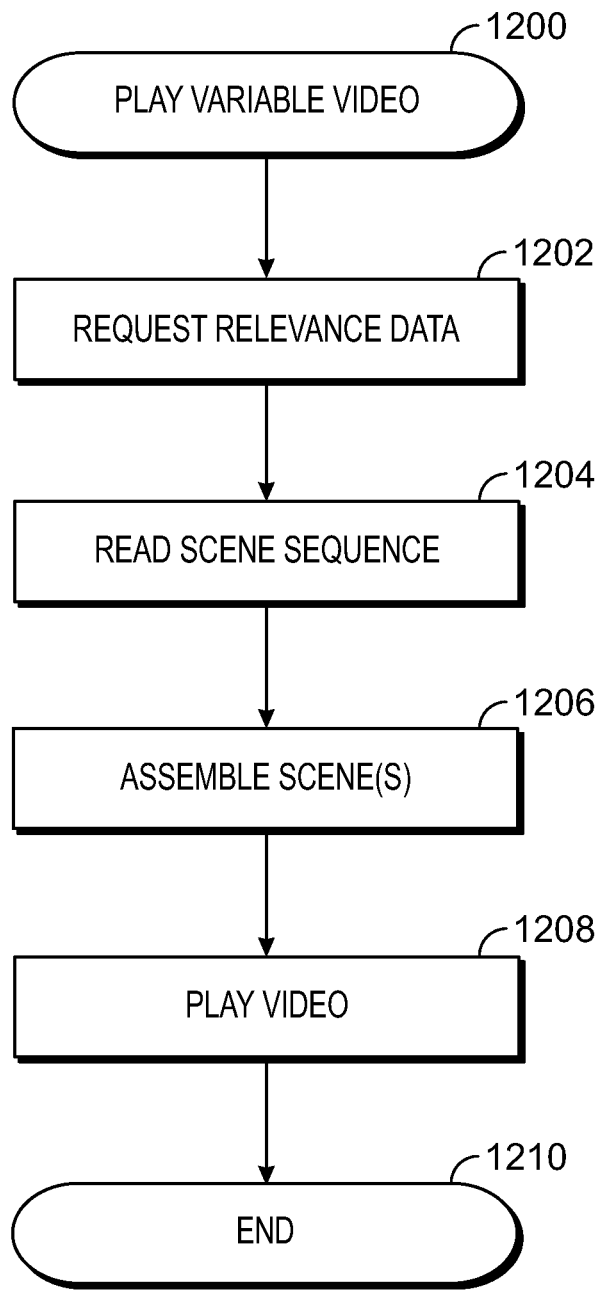
FIG. 12 is a second flow chart representative of example machine readable instructions that may be executed to implement example systems disclosed herein.

FIG. 12 illustrates an example method to play a variable video 1200. The example method 1200 includes requesting relevance data from an intended viewer (block 1202) using, for example, the example player 220 of FIG. 2, the example input interface 222 of FIG. 2 or the example player 1008 of FIG. 10. The intended viewer responds to a query and information gleaned from the response determines the relevance data.

The example method 1200 also includes reading a sequence of scenes (block 1204) and assembling sequence of scenes charted in a video file based on the relevance data and a vector tagged to the scenes based on content of the scenes (block 1206), using, for example, the example assembler 224 of FIG. 2. Another sequence of scenes may additionally and/or alternatively be assembled based on one or more of different vectors and/or different relevance data (block 1206). In some examples, the different sequences of scenes are read from the same file.

The example method 1200 also includes playing the video (block 1208) using, for example, the example compiler 228 of FIG. 2. Playing the video may occur in real time or near real time to the assembling the scene sequence. Rendering content of the scenes substantially simultaneously to the assembling the scene sequence.

Figure 13:
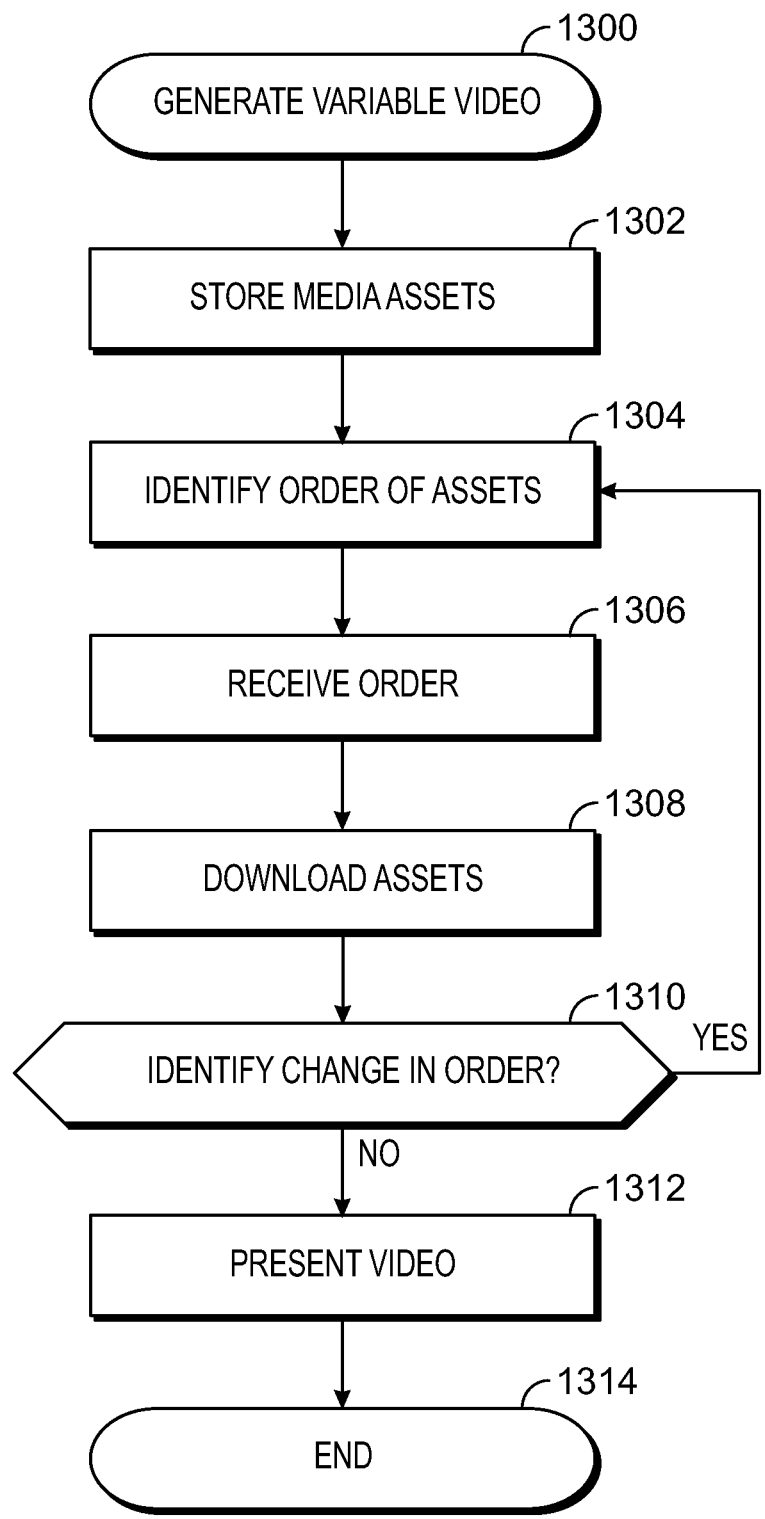
FIG. 13 is a third flow chart representative of example machine readable instructions that may be executed to implement example systems disclosed herein.

FIG. 13 illustrates a method of generating a variable video 1300. The example method 1300 includes storing media assets (block 1302) using, for example, the library 208 of FIG. 2. The example method also includes identifying an order of media assets for inclusion into a variable video (block 1304) using, for example, the example composer 202 of FIG. 2. In addition, the example method 1300 includes receiving the order of assets (block 1306) such as, for example, by the example player 220 of FIG. 2. In addition, the example method 1300 include downloading or otherwise obtaining the assets (block 1308), using, for example, the example player 220 of FIG. 2.

A change in the order of assets may be identified (block 1310) using, for example, the example system 200 of FIG. 2 including the composer 202 and builder 204. A change in the order of assets may be used to, for example, dynamically modify a particular variation of a video. If a change in the asset order is detected (block 1310), control returns to block 1304, where the order of asset is identified. If a change in the order is not detected (block 1310), the example method 1300 proceeds to present the video (block 1312) using, for example, the example player 220 of FIG. 2. Thereafter, the example method 1300 ends (block 1314).

Figure 14:
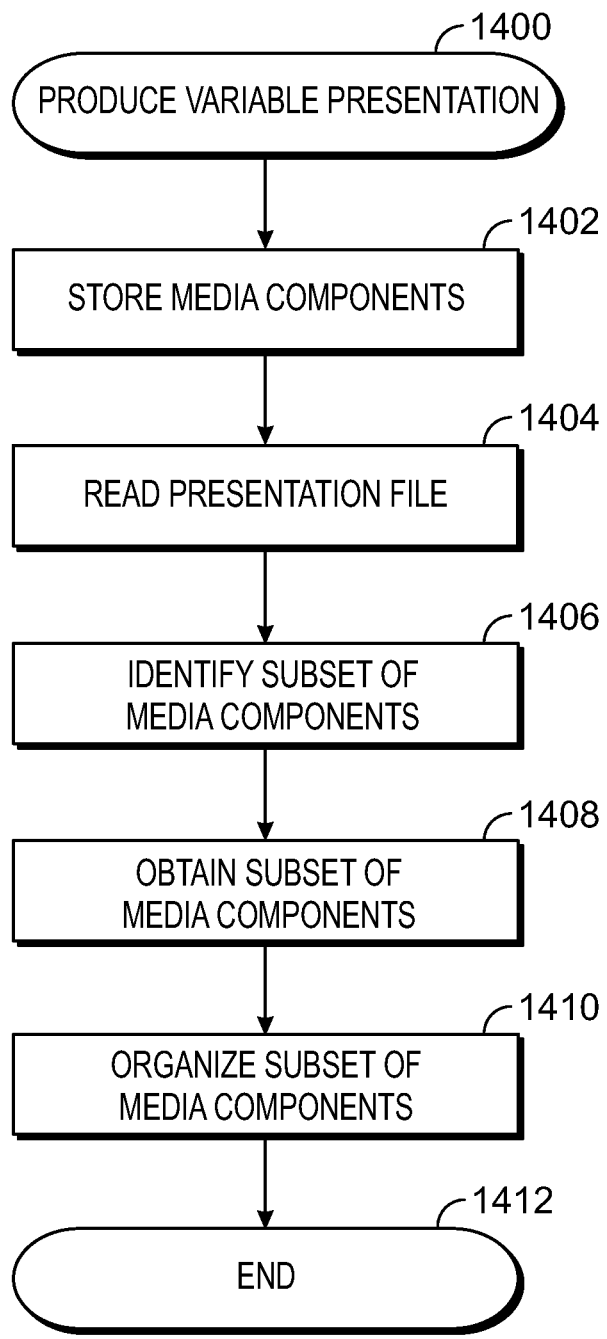
FIG. 14 is a fourth flow chart representative of example machine readable instructions that may be executed to implement example systems disclosed herein.

FIG. 14 illustrates an example method to produce a variable presentation (block 1400). The example method 1400 includes storing media components (block 1402) such as, for example, with in the example database 302 of FIG. 3. The example method 1400 also includes reading a presentation file (block 1404) and identifying a subset of media components (block 1406) using, for example, the example reader 304 of FIG. 3. In addition, the example method 1400 includes obtaining the subset of media components (block 1408) using, for example, the example retriever 306 of FIG. 3. The example method 1400 also includes organizing the subset of media components as indicated in the presentation file for presentation to a viewer (block 1410) using, for example, the example arranger 308 and/or selector 310 of FIG. 3. In some examples, one of more of the media component are presented simultaneously to the viewer as a first variable presentation and one or more different media components are presented simultaneously to the viewer and/or to another viewer as a second, different variable presentation.

Figure 15:
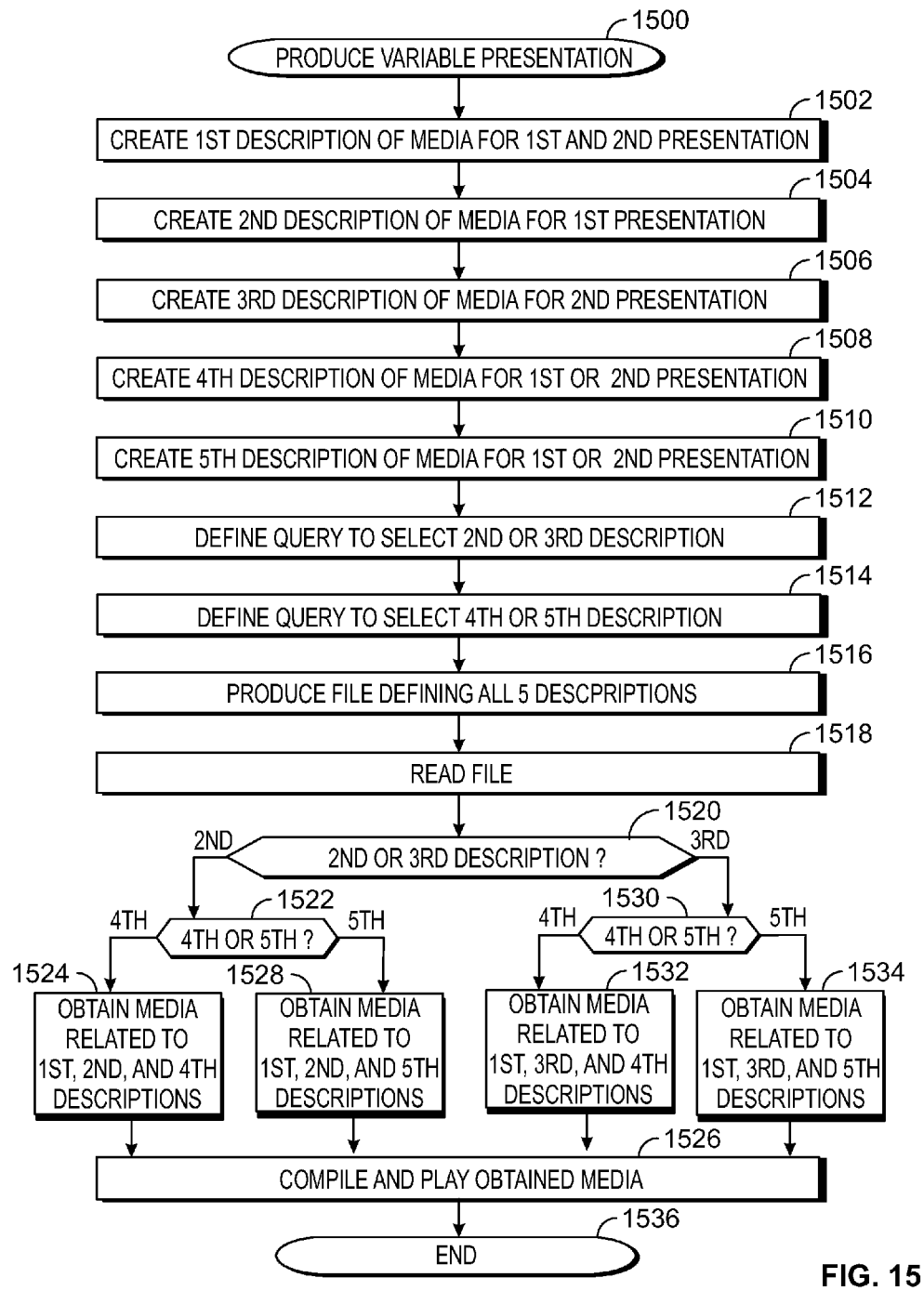
FIG. 15 is a fifth flow chart representative of example machine readable instructions that may be executed to implement example systems disclosed herein.

FIG. 15 illustrates an example method of producing a variable presentation 1500. The example method 1500 of FIG. 15 includes creating a first description of media for a first variable presentation and a second variable presentation (block 1502), using, for example, the example builder 204 of FIG. 2. The example method 1500 also includes creating a second description of media for the first variable presentation (block 1504) and creating a third description of media for the second variable presentation (block 1506) using, for example, the example builder 204 of FIG. 2. The example method 1500 also includes creating a fourth description of media for the first variable presentation and/or the second variable presentation (block 1508) and creating a fifth description of media for the first variable presentation and/or the second variable presentation (block 1510) using, for example, the example builder 204 of FIG. 2.

The example method 1500 also includes defining a first query (block 1512) using, for example the example builder 204 of FIG. 2. The first query is to be answered by an intended viewer to provide relevance data to determine or select the second or third description of media for inclusion in the variable video (e.g., to select between the second description vector or the third description vector). The example method 1500 also includes defining a second query (block 1514) to be answered by the intended viewer to provide additional relevance data to determine or select the fourth or fifth description of media for inclusion in the variable video (e.g., to select between the fourth description vector or the fifth description vector). The second query also may be defined, for example, with the example builder 204 of FIG. 2.

The example method 1500 also includes producing a file that includes all five descriptions of media (block 1516) using, for example, the example composer 202 of FIG. 2. The example file is a single file and may be an extensible markup language file.

The file is read (block 1518) using, for example, the example player 220 of FIG. 2. Based on the relevance data gathered from the responses to the queries, the example method determines if the second description of media or the third description of media should be read in the file and mapped so that the associated media is included in the variable video (block 1520). If the second description is selected, the example method determines if the fourth or fifth description of media should be read in the file and mapped so that the associated media is included in the variable video (block 1522). If the fourth description is selected (block 1522), the example method 1500 obtains the media related to the first, second and fourth descriptions (block 1524) and compiles and plays the first, second and fourth media (block 1526) using, for example, the player 220 of FIG. 2. If, at block 1522, the fifth description is selected, the example method 1500 obtains the media related to the first, second and fifth descriptions (block 1528) and compiles and plays the first, second and fifth media (block 1526).

If, at block 1520, the third description is selected, the example method determines if the fourth or fifth description of media should be read in the file and mapped so that the associated media is included in the variable video (block 1530). If the fourth description is selected (block 1530), the example method 1500 obtains the media related to the first, third and fourth descriptions (block 1532) and compiles and plays the first, third and fourth media (block 1526). If, at block 1530, the fifth description is selected, the example method 1500 obtains the media related to the first, third and fifth descriptions (block 1534) and compiles and plays the first, third and fifth media (block 1526). The example method 1500 may then end (block 1536).

Though the example method 1500 is illustrated using only two queries, any number of queries may be incorporated into the method resulting in potentially a limitless number of possible versions of the variable video.

Figure 16:
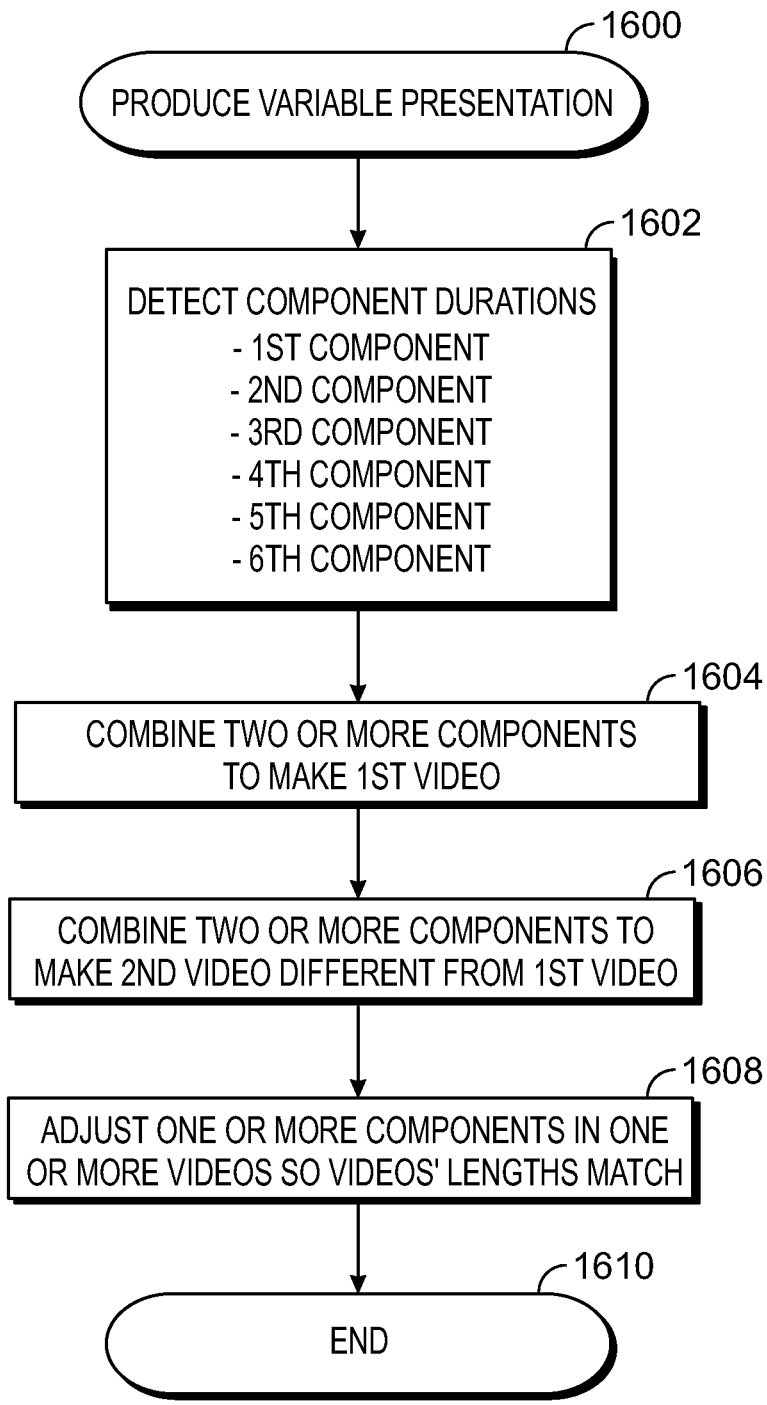
FIG. 16 is a sixth flow chart representative of example machine readable instructions that may be executed to implement example systems disclosed herein.

FIG. 16 illustrates a method to produce a variable presentation 1600. The example method includes detecting the duration of a plurality of media assets or components (block 1602) using, for example, the example detector 404 of FIG. 4. The example method 1600 also includes combining two or more media components to create a first variable presentation (block 1604) and two or more different media components to create a second variable presentation (block 1606), using for example, the example aggregator 406 of FIG. 4. The second variable presentation is different than the first variable presentation.

The example method 1600 includes adjusting a duration of one or more of the media components in one or more of the videos so that the length of each of the videos is consistent, i.e., so that the lengths of the different variable videos match (block 1608) using, for example, the example adjustor 408 of FIG. 4. The adjusting may include, for example, compacting or expanding one of the media components and/or zooming, panning and/or transitioning.

Figure 17:
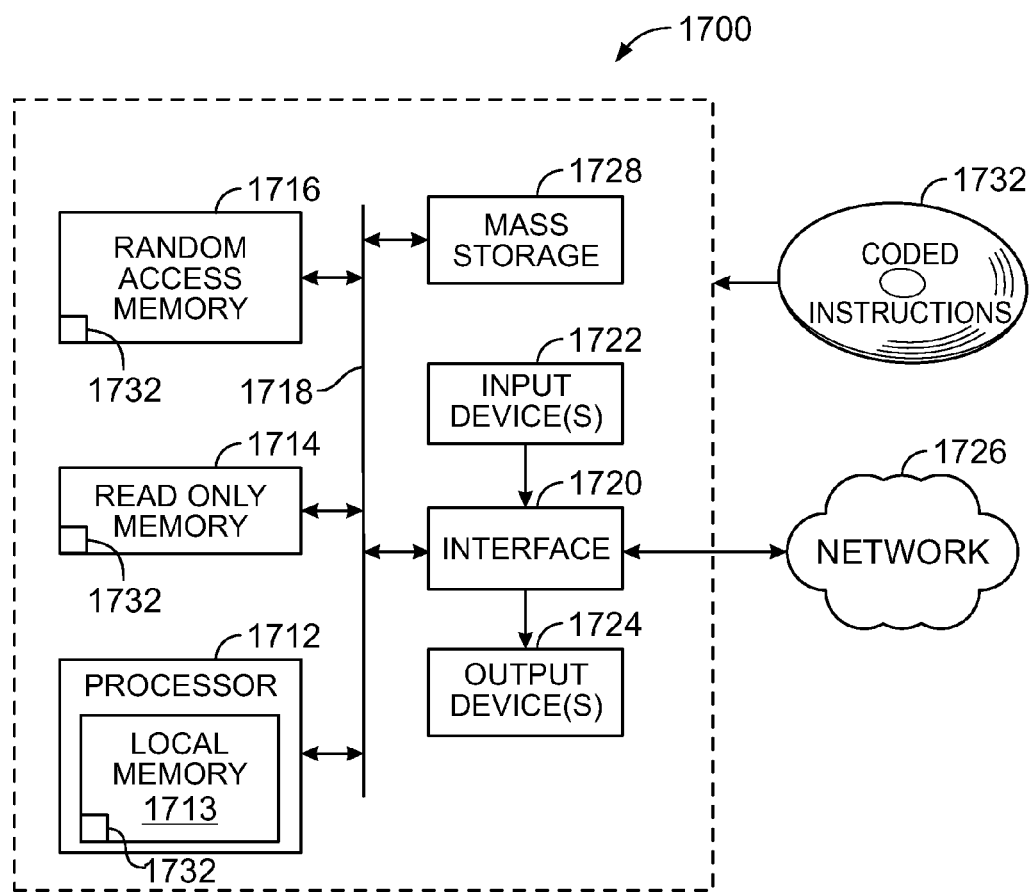
FIG. 17 illustrates an example processor platform that may execute the instructions of FIGS. 11-16 to implement any or all of the example methods, systems and/or apparatus disclosed herein.

FIG. 17 is a block diagram of an example computer 1700 capable of executing the instructions of FIGS. 11-16 to implement the apparatus and systems of FIGS. 1-4 and 10. The computer 1700 can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The system 1700 of the instant example includes a processor 1712. For example, the processor 1712 can be implemented by one or more microprocessors or controllers from any desired family or manufacturer.

The processor 1712 includes a local memory 1713 (e.g., a cache) and is in communication with a main memory including a non-volatile memory 1714 and a volatile memory 1716 via a bus 1718. The volatile memory 1716 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1714 may be implemented by flash memory and/or any other desired type of memory device. Access to the main memory 1714, 1716 is controlled by a memory controller.

The computer 1700 also includes an interface circuit 1720. The interface circuit 1720 may be implemented by any type of interface standard, such as an Ethernet interface, a universal serial bus (USB), and/or a PCI express interface.

One or more input devices 1722 are connected to the interface circuit 1720. The input device(s) 1722 permit a user to enter data and commands into the processor 1712. The input device(s) can be implemented by, for example, a keyboard, a mouse, a touchscreen, a track-pad, a trackball, isopoint and/or a voice recognition system.

One or more output devices 1724 are also connected to the interface circuit 1720. The output devices 1724 can be implemented, for example, by display devices (e.g., a liquid crystal display, a cathode ray tube display (CRT), a printer and/or speakers). The interface circuit 1720, thus, typically includes a graphics driver card.

The interface circuit 1720 also includes a communication device such as a modem or network interface card to facilitate exchange of data with external computers via a network 1726 (e.g., an Ethernet connection, a digital subscriber line (DSL), a telephone line, coaxial cable, a cellular telephone system, etc.).

The computer 1700 also includes one or more mass storage devices 1728 for storing software and data. Examples of such mass storage devices 1728 include floppy disk drives, hard drive disks, compact disk drives and digital versatile disk (DVD) drives. The mass storage device 1728 may implement the library 208, database 302 and/or database 402.

The coded instructions 1732 of FIGS. 11-16 may be stored in the mass storage device 1728, in the volatile memory 1716, in the non-volatile memory 1714, and/or on a removable storage medium such as a CD or DVD.

From the foregoing, it will appreciated that the above disclosed methods, apparatus and articles of manufacture of variable video publishing enable the creation, production and delivery of high quality, personalized video content. The examples disclosed herein make integrating relevant variable video into direct marketing programs easy, practical, and inexpensive. The examples disclosed herein deliver highly engaging video content, provide the production workflow for developing relevant, individualized videos, and provide a simple and robust mechanism for on-demand delivery of the variable videos.

Unlike typical methods of web video publishing, the examples disclosed herein assemble video from individual media elements such as video, animation, voice-over, text and/or branded images. Delivering variable videos on demand, the examples disclosed herein are scalable, fully automated and suited for large-scale web video applications and relevant video delivery for individual customers.

Two components of the examples described herein are the composer authoring tool with which videos are built and the player that assembles videos on the fly from individual media elements and delivers the videos on demand. Together, the composer and player and the dynamic composition they enable offer direct marketers to utilize deep, data-driven variability through versioned, customized, personalized video content.

In some examples, as disclosed above, the composer is an online tool that simplifies the authoring of variable video content. The composer may leverage existing libraries of still photography, adding motion in the form of pan, zoom, transitions, and/or animation and combine these elements with music and/or voice-over. In addition, the composer may provide a simple interface for creating and editing pans and/or zooms, which turns still imagery into compelling video segments. In some examples, a single login portal gives access to all of a user's videos and shared media—grouped by project. In some examples, the composer uses a simple drag-and-drop interface to manage the acts and scenes within a video. In such examples, elements may be intuitively dragged from the media palette of the composer to create new scenes or edit existing scenes. The same user interface may also offer editing of title and caption texts. In some examples, the composer includes a preview window that enables previewing a video at any point during production. The preview shows what an end user will see, making it easy to gauge pacing and quality, and refining the video for just the right impression.

In some disclosed examples the player is been optimized to display image effects with a maximum of clarity and a minimum of download time to give customers and other intended viewers the best possible interactive viewing experience. In some examples, video and/or audio clips are uploaded directly from a desktop, and each clip is automatically encoded using an encoding for distribution such as, for example, a VP6 encoder, for TV quality media. Other encoding formats are available for utilization within the composer user interface as well. In some examples, the composer also includes an uncompressed voice-over recording tool, which enables studio-quality audio production directly from within the composer user interface and makes voice-over production seamless and easy.

Because variable videos are dynamically composed at the time of playback, the disclosed examples also may integrate database variables directly into a variable video for increased personalization where appropriate and/or desired.

Unlike traditional video, the content disclosed herein is not pre-rendered. The variable videos are built on-the-fly (e.g., at the time of playback). In addition, the disclosed examples separate content and format to make variability possible and updates easy. Media elements are kept intact as discrete and easily editable components. Even when enhanced with pan, zoom, and/or transition effects, the individual media assets remain as isolated, editable components in the variable video. Updating a variable video is as simple as replacing a single media element, whether the element is a voice-over, text element, animation, and/or a full-motion video scene. There is no rendering or distribution penalty for making edits to the variable videos.

Because the composer leverages a wide range of pre-existing creative assets, from music and voice-over to still photography and full-motion video, the variable videos are easier to produce and less expensive to maintain than traditional video. Because the variable videos are modular or component-based in nature, built in discrete acts and scenes, the videos are easy to edit and update and easy for intended viewers (e.g., customers) to navigate. Also, because the videos are dynamically assembled or composited by pulling content elements from a database such as, for example a cloud, it is easy to vary single assets within scenes based on pre-determined relevance logic.

The disclosed examples facilitate the presentation of a consistent branded experience for intended viewers by providing branded scene layouts and templated movie structures for different types of content. Some examples include custom corporate layout templates to ensure consistent design and branding for all video output across an organization. With templated movie design, even unskilled individuals within the marketing organization can contribute to media asset and video creation.

The examples disclosed herein also maintain very high image quality relative to traditional compressed digital video, while also significantly reducing bandwidth relative to traditional compressed digital video approaches. Furthermore, the examples disclosed herein incorporate a high-availability, scalable, and secure front end using an intuitive online editing user interface, combined with a sophisticated content delivery network back end. In addition, the disclosed examples can handle spikes in demand and easily integrate with existing web content publishing systems.

The examples disclosed here may provide a video medium for product education and rich media recommendation segments, and the examples may also deliver messages residing on personal URLs and/or personal websites. The examples disclosed herein are may be useful for many companies, marketers, marketing departments, organizations and/or other entities including, for example, entities selling products or services that are large considered purchases, deep digital catalogs that could benefit from richer video based product demos, large video libraries on corporate websites, companies that want to use video as a significant part of their online customer experience, companies that want to run rich-media integrated marketing programs, companies that want the convenience of one vendor for marketing in print, email, web and online video, companies that have an investment in data modeling or analytics but lack the resources to effectively utilize such modeling and analytics, companies that have an investment in expensive product photography and want to leverage these assets more effectively, companies that are small but with large goals and/or audiences and/or companies that appreciate the enhanced value of relevant communications.

The examples disclosed herein reduce the cost of creating and updating videos for corporations whose products change and/or who have video needs in multiple languages. In addition, the examples disclosed herein facilitate creating a suite of video templates for a consistent customer experience across an enterprise. Also, the examples disclosed herein may be customized on-the-fly to present information germane to the customer's buying requirements. The example relevance rules control individual acts and scenes of a customer's video, providing each customer with precisely the right content for his or her situation. Relevant communications combined with video provide effective and enhanced marketing.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A composer to author a variable video comprising a plurality of sequences, the composer comprising:
   a builder to create a plurality of scenes;
   a content retriever to assign content to each of the plurality of scenes;
   a library interface to point to the content for each of the plurality of scenes;
   a labeler to tag each of the plurality of scenes with one or more vectors of relevancy based on attributes of the content;
   a mapper to chart a first sequence of the plurality of sequences of the variable video comprising a first subset of the plurality of scenes, the scenes in the first subset to be selected based on (1) a first one of the vectors of relevancy and (2) first viewer relevance data associated with a first intended viewer, and to chart a second sequence of the plurality of sequences of the variable video comprising a second subset of the plurality of scenes, the scenes in the second subset to be selected based on (1) at least one of (a) the first one of the vectors of relevancy or (b) a second one of the vectors of relevancy and (2) second viewer relevance data associated with a second intended viewer; and
   a publisher comprising a processor to publish the variable video as a single file for creating the first and second sequences of the variable video.

2. A composer as defined in claim 1, wherein a first component of a scene is tagged with a first vector of relevancy and a second component of the scene is tagged with a second vector of relevancy.

3. A composer as defined in claim 1, wherein the first or second viewer relevance data is demographic data.

4. A composer as defined in claim 1, wherein the content includes one or more of video, animation, voice-over, text, branding, audio or still photography.

5. A composer as defined in claim 1, wherein the content includes still photography and photo stretching techniques including at least one of pan, zoom or transition.

6. A composer as defined in claim 1, wherein the builder is to use a drag and drop technique to create the plurality of scenes.

7. A composer as defined in claim 1, wherein the content includes a personal uniform resource locator.

8. A composer as defined in claim 1, wherein the content is stored on a network and the library interface is communicatively coupled to the network.

9. A composer as defined in claim 1, wherein the file is an extensible markup language file.

10. A composer as defined in claim 1, wherein the composer is to publish the variable video as the single file for creating the first and second sequences of the variable video without compiling the content of the first and second sequences of the variable video.

11. A method of authoring a variable video comprising a plurality of sequences, the method comprising:
    creating a plurality of scenes;
    assigning content to each of the plurality of scenes;
    pointing to the content for each of the plurality of scenes;
    tagging each of the plurality of scenes with one or more vectors of relevancy based on attributes of the content;
    charting a first sequence of the plurality of sequences of the variable video comprising a first subset of the plurality of scenes, the scenes in the first subset to be selected based on (1) a first one of the vectors of relevancy and (2) first viewer relevance data associated with a first intended viewer, and to chart a second sequence of the plurality of sequences of the variable video comprising a second subset of the plurality of scenes, the scenes in the second subset to be selected based on (1) at least one of (a) the first one of the vectors of relevancy or (b) a second one of the vectors of relevancy and (2) second viewer relevance data associated with a second intended viewer; and
    publishing the variable video as a single file for creating the first and second sequences of the variable video.

12. A method as defined in claim 11 further comprising tagging a first component of a scene with a first vector of relevancy and tagging a second component of the scene with a second vector of relevancy.

13. A method as defined in claim 11, wherein the first or second viewer relevance data is demographic data.

14. A method as defined in claim 11, wherein the content includes one or more of video, animation, voice-over, text, branding, audio or still photography.

15. A method as defined in claim 11, wherein the content includes still photography and photo stretching techniques including at least one of pan, zoom or transition.

16. A method as defined in claim 11 further comprising using a drag and drop technique to create the plurality of scenes.

17. A method as defined in claim 11, wherein the content includes a personal uniform resource locator.

18. A method as defined in claim 11, wherein the content is stored on a network and a library interface for pointing to the content is communicatively coupled to the network.

19. A method as defined in claim 11, wherein the file is an extensible markup language file.

20. A method as defined in claim 11 further comprising publishing the variable video as the single file for creating the first and second sequences of the variable video without compiling the content of the first and second sequences of the variable video.

21. A machine readable medium having instructions stored thereon, which when executed, cause a machine to at least:
    create a plurality of scenes;
    assign content to each of the plurality of scenes;
    point to the content for each of the plurality of scenes;
    tag each of the plurality of scenes with one or more vectors of relevancy based on attributes of the content;
    chart a first sequence comprising a first subset of the plurality of scenes, the scenes in the first subset to be selected based on (1) a first one of the vectors of relevancy and (2) first viewer relevance data associated with a first intended viewer, and to chart a second sequence comprising a second subset of the plurality of scenes, the scenes in the second subset to be selected based on (1) at least one of (a) the first one of the vectors of relevancy or (b) a second one of the vectors of relevancy and (2) second viewer relevance data associated with a second intended viewer; and
    publish a single file for creating the first and second sequences as a variable video.

22. A medium as defined in claim 21 further causing a machine to tag a first component of a scene with a first vector of relevancy and tag a second component of the scene with a second vector of relevancy.

23. A medium as defined in claim 21, wherein the first or second viewer relevance data is demographic data.

24. A medium as defined in claim 21, wherein the content includes one or more of video, animation, voice-over, text, branding, audio or still photography.

25. A medium as defined in claim 21, wherein the content includes still photography and photo stretching techniques including at least one of pan, zoom or transition.

26. A medium as defined in claim 21 further causing a machine to use a drag and drop technique to create the plurality of scenes.

27. A medium as defined in claim 21, wherein the content includes a personal uniform resource locator.

28. A medium as defined in claim 21, wherein the content is stored on a network and a library interface for pointing to the content is communicatively coupled to the network.

29. A medium as defined in claim 21, wherein the file is an extensible markup language file.

30. A medium as defined in claim 21 further causing a machine to publish the variable video as the single file for creating the first and second sequences without compiling the content of the first and second sequences.

31. A composer as defined in claim 1, wherein the first subset is further selected based on third viewer relevance data to be provided by the first intended viewer of the first sequence of the plurality of sequences of the variable video, and the second subset is further selected based on fourth viewer relevance data to be provided by the second intended viewer of the second sequence of the plurality of sequences of the variable video, wherein each of the first viewer relevance data, the second viewer relevance data, the third viewer relevance data, and the fourth viewer relevance data comprises a characteristic of the respective first or second intended viewers.

32. A composer as defined in claim 1, further comprising a receiver to define queries for prompting the first and second intended viewers to provide the first and second viewer relevance data.

* * * * *